(12) United States Patent
Guleryuz

(10) Patent No.: US 7,079,687 B2
(45) Date of Patent: Jul. 18, 2006

(54) METHOD AND APPARATUS FOR SEGMENTATION OF COMPOUND DOCUMENTS

(75) Inventor: Onur G. Guleryuz, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 331 days.

(21) Appl. No.: 10/625,107

(22) Filed: Jul. 23, 2003

(65) Prior Publication Data

US 2004/0174546 A1 Sep. 9, 2004

Related U.S. Application Data

(60) Provisional application No. 60/453,077, filed on Mar. 6, 2003.

(51) Int. Cl.
*G06K 9/34* (2006.01)
*G06K 9/40* (2006.01)
*H04N 1/407* (2006.01)

(52) U.S. Cl. .................. 382/180; 382/263; 382/266; 358/3.27; 358/534

(58) Field of Classification Search ............. 358/1.9, 358/534, 465, 448, 443, 1.2, 3.01, 3.06, 3.07, 358/447, 466, 2.1, 3.27, 463; 382/180, 254, 382/270, 176, 173, 299, 298, 276, 266, 275
See application file for complete search history.

(56) References Cited

U.S. PATENT DOCUMENTS 4,288,821 A * 9/1981 Lavallee et al. ........... 358/3.07
4,893,188 A 1/1990 Murakami et al. ........... 358/2.1
5,014,124 A 5/1991 Fujisawa ..................... 358/530
5,131,059 A 7/1992 Kobayashi et al. .......... 358/2.1
5,327,262 A * 7/1994 Williams .................... 358/462
5,392,365 A 2/1995 Steinkirchner .............. 382/260
5,617,216 A 4/1997 Wada ......................... 358/2.1
5,949,964 A * 9/1999 Clouthier et al. .......... 358/3.06
6,198,850 B1 3/2001 Banton ....................... 382/239
6,229,923 B1 * 5/2001 Williams et al. ............ 382/224
6,347,153 B1 * 2/2002 Triplett et al. .............. 382/224
6,385,344 B1 5/2002 Irie et al. .................... 382/237
6,389,167 B1 5/2002 Wetchler et al. ............ 382/197
6,437,878 B1 8/2002 Hansen et al. .............. 358/2.1
2001/0015826 A1 8/2001 Kuroee
2002/0057459 A1 5/2002 Nagarajan et al.
2002/0067509 A1 6/2002 Roylance

* cited by examiner

*Primary Examiner*—Kanjibhai Patel
*Assistant Examiner*—Sheela Chawan

(57) ABSTRACT

A method for segmenting a compound document initiates with receiving image data, followed by processing the image data at both a first scale and a second scale. Next, region types of the compound document are determined according to a combination of processing output at the first scale and processing output at the second scale. Methods for labeling digital image data and labeling and enhancing documents defined through digital data, as well as associated computer readable medium embodiments are provided. An image replication device and a microprocessor configured to segment and enhance image data associated with a compound document are also provided.

41 Claims, 30 Drawing Sheets

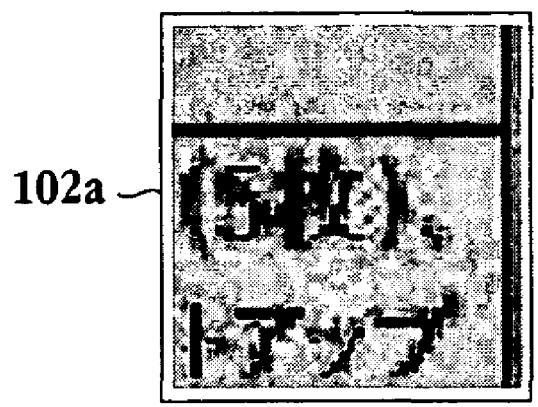
Fig. 1A
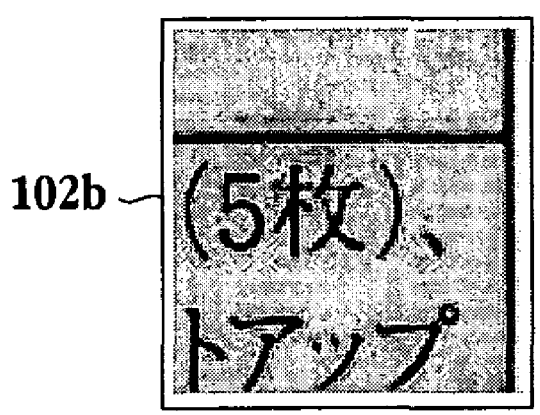
Fig. 1B
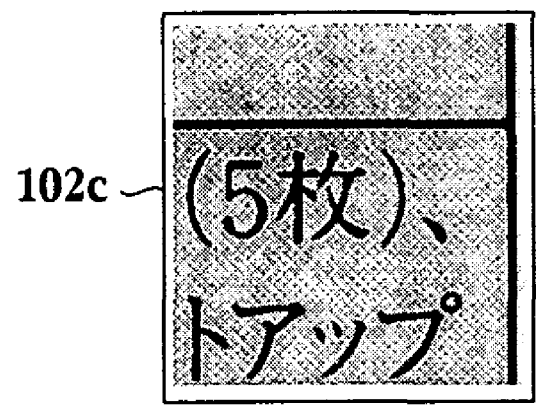
Fig. 1C

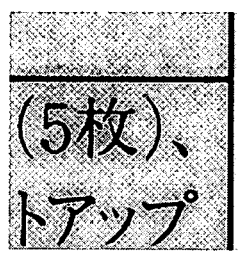   
       Fig. 5A                 Fig. 5B
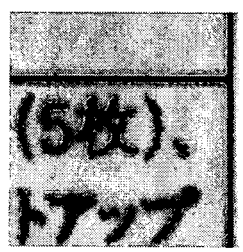 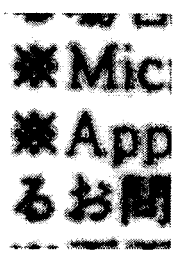  
       Fig. 6A                 Fig. 6B

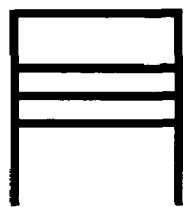 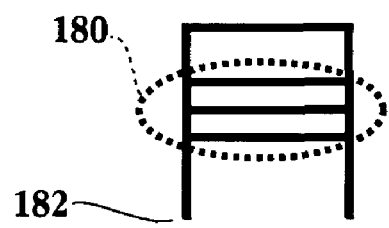 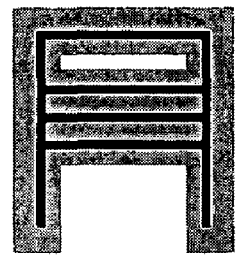
Fig. 7A      Fig. 7B      Fig. 7C
Thin coarse edges
▒ Thick coarse edges
■ Final thin coarse edges
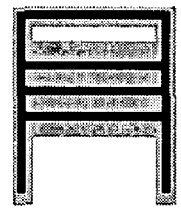 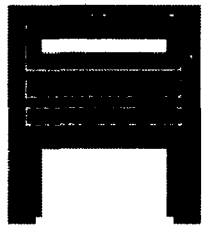
Fig. 7D      Fig. 7E

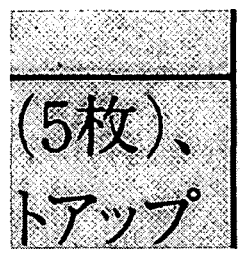  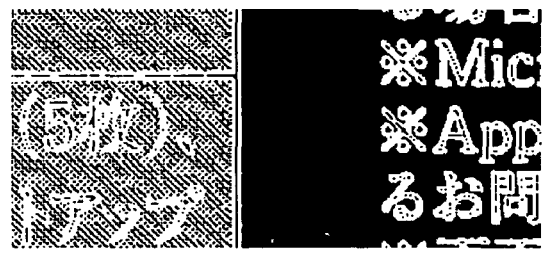
Fig. 8A                Fig. 8B
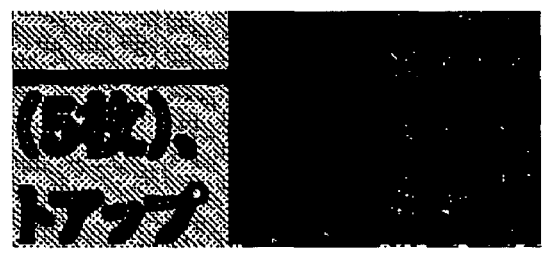
Fig. 9

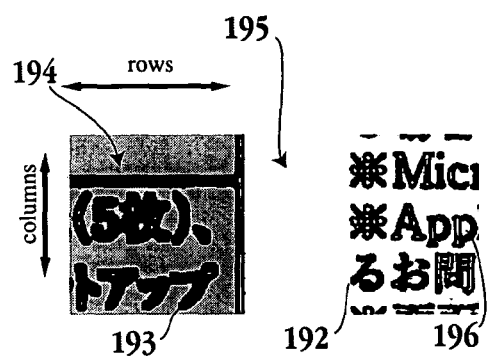 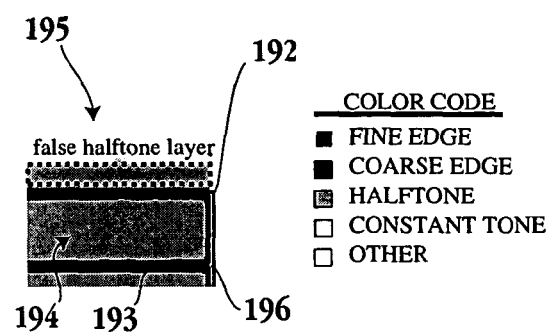
Fig. 13A                Fig. 13B
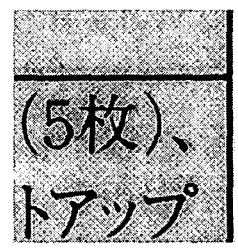   
Fig. 14A                Fig. 14B

Example halftones
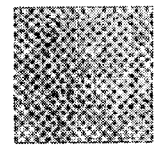
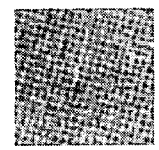
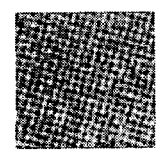
Fig. 16A

Case 1
Case 1
Case 3 (mislabeled text on non-halftone region)
Case 2
Case 2 & Case 4

COLOR CODE
■ FINE EDGE
■ COARSE EDGE
▦ HALFTONE
☐ CONSTANT TONE
☐ OTHER

COLOR CODE
▨ HALFTONE
☐ NON_HALFTONE

COLOR CODE
■ HALFTONE
☐ NON_HALFTONE

Example halftones
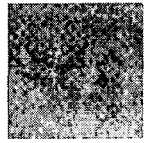
Fig. 17A

Case 4 (missed small halftone region)

COLOR CODE
- FINE EDGE
- COARSE EDGE
- HALFTONE
- CONSTANT TONE
- OTHER

COLOR CODE
- HALFTONE
- NON_HALFTONE

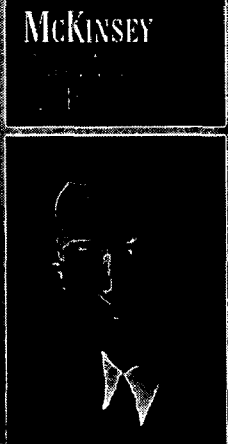
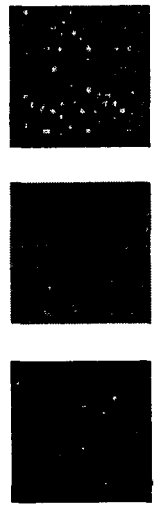
Example halftones
Fig. 18A

Fig. 18B — Case 5 (transition from halftone to non-halftone)
COLOR CODE
- FINE EDGE
- COARSE EDGE
- HALFTONE
- CONSTANT TONE
- OTHER

COLOR CODE
▩ HALFTONE
☐ NON_HALFTONE

COLOR CODE
- HALFTONE
- NON_HALFTONE

COLOR CODE
■ FINE EDGE
■ COARSE EDGE
▓ HALFTONE
☐ CONSTANT TONE
☐ OTHER

Fig. 19C

COLOR CODE
■ FINE EDGE
■ COARSE EDGE
▨ HALFTONE
☐ CONSTANT TONE
☐ OTHER

COLOR CODE
- ■ FINE EDGE
- ■ COARSE EDGE
- ▨ HALFTONE
- ☐ CONSTANT TONE
- ☐ OTHER

Fig. 22A
Fig. 22B
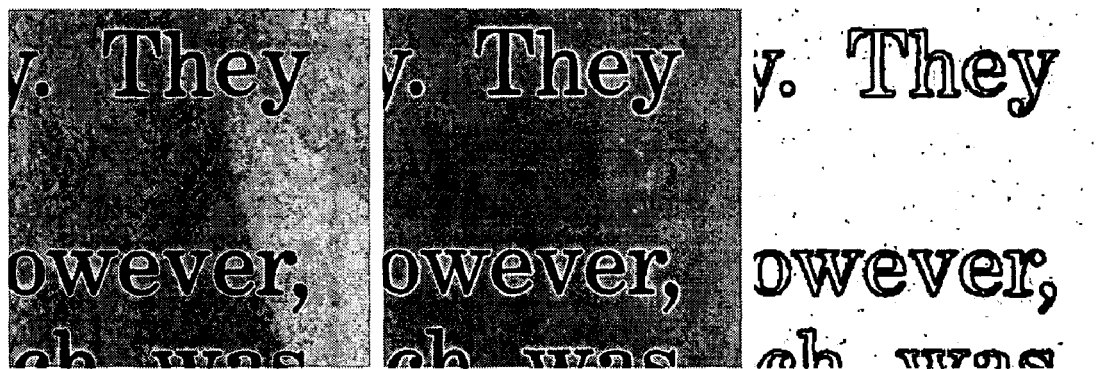
Fig. 22C
COLOR CODE
■ FINE EDGE
■ COARSE EDGE
▨ HALFTONE
☐ CONSTANT TONE
☐ OTHER

METHOD AND APPARATUS FOR SEGMENTATION OF COMPOUND DOCUMENTS

CROSS REFERENCE TO RELATED APPLICATIONS

This application claims priority from U.S. Provisional Patent Application No. 60/453,077 filed Mar. 6, 2003, and entitled "LOW COMPLEXITY COMPREHENSIVE LABELING AND ENHANCEMENT ALGORITHM FOR COMPOUND DOCUMENTS." This provisional application is incorporated by reference herein for all purposes.

BACKGROUND OF THE INVENTION

1. Field of the Invention

This invention relates generally to document replication systems and more particularly to a method and apparatus for segmenting and enhancing compound documents for image replication applications.

2. Description of the Related Art

The quest for high quality in everyday copying applications has led to increased sophistication in scanners and printers. In particular, the desire for high quality text and graphics output has forced modern scanners and printers to operate at 600 dots per inch (dpi) or higher dpi resolutions even on basic document applications. However, the associated increases in the costs of these devices leaves little room for the expense of signal processing algorithms which must still accomplish high quality output in an automated mode of operation. The result is a direct need for compound document processing techniques of very low computational and memory complexity.

The constraint for very low cost algorithms is in part alleviated by the high resolution devices that make up a copier. Modem scanners with low noise sensors and printers with precision dot placement no longer necessitate very high performance signal processing for noise removal, deblurring, etc. However, halftone dots in the input become much more pronounced in high resolutions, thereby resulting in possible Moiré artifacts that are introduced if such regions are printed unprocessed. FIGS. 1A–1C illustrate various portions of a document scanned at different resolutions. FIG. 1A is scanned at 150 dpi, FIG. 1B is scanned at 300 dpi and FIG. 1C is scanned at 600 dpi. It should be appreciated that FIG. 1A and FIG. 1B were scaled to 600 dpi by pixel replication for comparison purposes. As illustrated in successive halftone regions $102a$–$102c$ of FIGS. 1A–1C, respectively, the resolution increases from 150 dpi to 600 dpi. While the text and other edges become sharper with the increasing resolution, the halftone dots become more pronounced.

Attempts to segment a compound document to halftone and non-halftone regions have met with limited success. For example, some techniques require pre-segmentation of the document into blocks or other rectangular regions. Additionally, some segmentation techniques look at the document at a single resolution, which inevitably leads to erroneous decisions and may restrict the technique to detecting a particular class of halftones. Furthermore, these techniques are not applicable to general document types, such as scanned documents, and are associated with a high computational complexity and excessive consumption of memory resources.

Additionally, previous attempts mainly concentrate on region classification on documents that have been pre-segmented to their constituent regions. Each one of the pre-segmented regions are classified into various classes and the segmentation is typically delegated to sophisticated and computationally complex document analysis algorithms. Furthermore, irrespective of how simple the region classification is, such approaches demand at least two passes on the data resulting in significant memory and memory-bandwidth requirements. Moreover, the overall operation of pre-segmentation and classification may still require considerable computation. These pre-segmentation requiring methods range from simple techniques which use an "α-crossing" technique for detecting halftone regions, and techniques which operate on binary only documents and detect halftone regions using predefined masks, to the more elaborate and computationally complex techniques, which utilize Fourier transforms and tuned directional bandpass filters for texture analysis and halftone detection. The previous techniques effectively pit halftone and text regions against one another by basing the identification decision on complex statistics (the alternative hypothesis are text, halftone, non-halftone, etc.) By subtracting most of the influence of real document edges, the segmentation and identification decisions in this work are based on simple statistics (the alternative hypothesis are halftone and non-halftone).

Other work that tries to identify halftones by detecting periodicities is limited to input documents containing certain types of halftones. Moreover, one must be assured that periodicities in the original halftone are sufficiently preserved after the color space change due to the scan of the original printed halftone (for e.g., CMYK to RGB). Techniques that try to detect real document edges that are not due to halftone dots by using edge continuity analysis are severely sensitive to thresholds since disconnected halftone dots may appear connected depending on the threshold used in edge detection.

As a result, there is a need to solve the problems of the prior art to provide a technique that segments a document irrespective of the document characteristics and minimizes the computational cost as well as memory consumption.

SUMMARY OF THE INVENTION

Broadly speaking, the present invention fills these needs by defining a multi-resolutional scheme for labeling and decomposing a broad range of documents followed by the selective enhancement of the document, while consuming minimal computational and memory resources. It should be appreciated that the present invention can be implemented in numerous ways, including as a process, a system, or a device. Several inventive embodiments of the present invention are described below.

In one embodiment, a method of labeling digital image data is provided. The method initiates with a) detecting edges defined by image data having a first resolution. Then b) edges defined by the image data having a second resolution are detected. Next, c) the results from a) are combined with the results from b) to define intermediate image data. Next, d) a label is associated with each pixel of the image data.

In another embodiment, a method for labeling and enhancing documents defined through digital data is provided. The method initiates with detecting edge data defined in a portion of the document. Then, a region type associated with the portion of the document is identified. Next, a pixel associated with the edge data is labeled based upon both the region type and a pixel neighborhood value.

In yet another embodiment, a computer readable medium having program instructions for labeling digital image data is provided. The computer readable medium includes program instructions for detecting edges defined by image data having a first resolution. Program instructions for detecting edges defined by the image data having a second resolution and program instructions for combining data defined by the first resolution with data defined by the second resolution to define intermediate image data are included. Program instructions for associating a label with a portion of the image data are also provided.

In still yet another embodiment, a computer readable medium having program instructions for labeling and enhancing documents defined through digital data is provided. The computer readable medium includes program instructions for detecting edge data defined in a portion of the document. Program instructions for identifying a region type associated with the portion of the document are provided. Program instructions for labeling a pixel associated with the edge data based upon both the region type and a pixel neighborhood value are included.

In another embodiment, a method for segmenting a compound document is provided. The method initiates with receiving image data. Then, the image data is processed at both a first scale and a second scale. Next, region types of the compound document are determined according to a combination of processing output at the first scale and processing output at the second scale.

In yet another embodiment, a microprocessor configured to segment and enhance image data associated with a compound document is provided. The microprocessor includes circuitry for labeling each pixel of the image data and circuitry for descreening halftone regions of the image data. Circuitry for enhancing each identified segment of the image data is also included.

In still yet another embodiment, an image replication device is provided. The image replication device includes a labeling module configured to segment image data associated with a document. The image data has a halftone portion and a non-halftone portion. The labeling module includes a first branch and a second branch. The first branch is configured to suppress halftone dots of the halftone portion prior to detecting edge data of the document.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 1A–1C illustrate various portions of a document scanned at different resolutions.

FIGS. 5A and 5B illustrate an original image potion and a low pass filtered image portion of the original, respectively.

FIGS. 6A and 6B illustrate the low pass filtered image of FIG. 5B and detected coarse scale edges from the low pass filtered image, respectively, in accordance with one embodiment of the invention.

FIGS. 7A–7E are schematic diagrams illustrating an edge proximity technique for detecting missed edges during coarse edge detection on a schematic text character in accordance with one embodiment of the invention.

FIGS. 8A and 8B illustrate an original scanned image portion and a corresponding labeled fine scale image portion, respectively, in accordance with one embodiment of the invention.

FIG. 9 illustrates an image portion having locations marked as fine edges but not as coarse edges for the example document in accordance with one embodiment of the invention.

FIGS. 13A and 13B are schematic diagrams illustrating the per-pixel labels obtained for the examples depicted in FIG. 5A and FIG. 11A, respectively.

FIGS. 14A and 14B illustrate the original scanned document and the enhanced output, respectively, in accordance with one embodiment of the invention.

FIGS. 16A–16E illustrate performance of the embodiments described herein on a multilingual document containing halftones and fine text.

FIGS. 17A–17E illustrate performance of the embodiments described herein on a multilingual document having a very irregularly shaped halftone region.

FIGS. 18A–18E again shows performance of the embodiments described herein on a document with an irregularly shaped halftone region.

FIGS. 19A–19C show the enhancement results under situations due to Case 1 and Case 3 type errors in accordance with one embodiment of the invention.

FIGS. 22A–22C are a schematic diagrams illustrating the technique's performance on bleed-through removal.

DETAILED DESCRIPTION OF THE PREFERRED EMBODIMENTS

Figure 2:
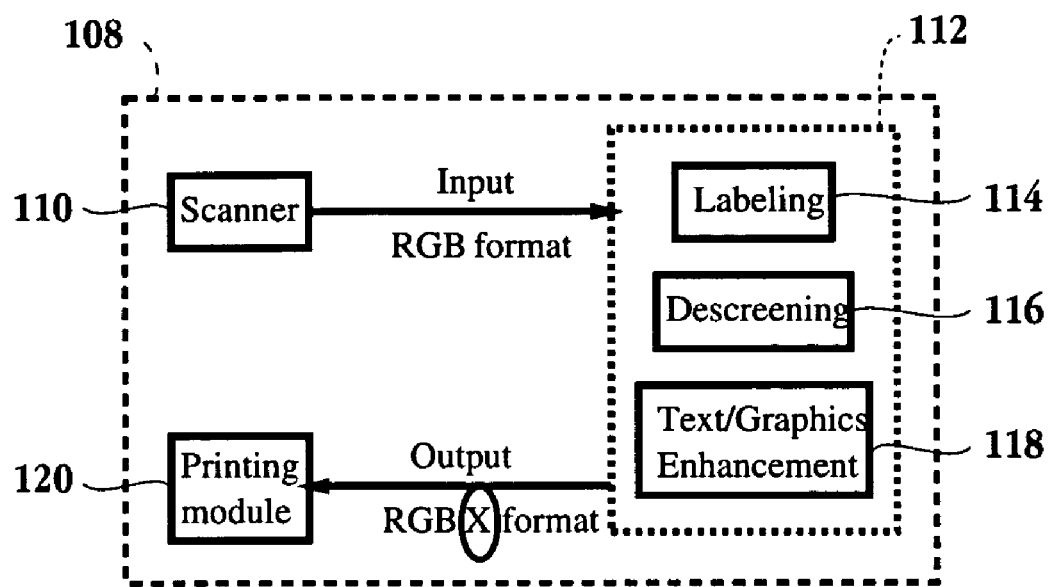
FIG. 2 is a simplified schematic diagram illustrating a copier pipeline configured to execute the segmentation, labeling and selective enhancement functionality in accordance with one embodiment of the invention.

An invention is described for an apparatus and method for providing a stable output while minimizing moire patterns and visible structures when printing images from a printing device. It will be apparent, however, to one skilled in the art in light of the following disclosure, that the present invention may be practiced without some or all of these specific details. In other instances, well known process operations have not been described in detail in order not to unnecessarily obscure the present invention. FIGS. 1A–1C are described in the "Background of the Invention" section.

The embodiments of the present invention provide an apparatus and method for segmenting, labeling and then enhancing an image consisting of various regions of pixels, e.g., text/graphics, images halftones, text/graphics on halftones, constant tones, etc. The image is decomposed into various types of regions so that enhancement techniques optimized for a particular region may be applied to that region. It should be appreciated that the enhanced image may be halftoned and printed, displayed on a monitor, compressed and stored, etc. That is, the results of embodiments described herein may be sent to a multitude of devices and converted into a multitude of formats. The scheme enabling the embodiments described is multi-resolutional in nature, i.e., the scheme looks at the document in more than one resolution to more accurately segment the document. In one embodiment, the scheme defined herein performs processing on the input (fine scale) and the low pass filtered version of the input (coarse scale). Edge detection is done at the two resolutions to mark "coarse edges" on the low pass filtered image and "fine edges" on the original image. With the low pass filter chosen to suppress most of the halftone, the edge detection on the low pass filtered image marks most of the real edges (due to image edges, text, graphics, etc.), while fine edge detection marks the real edges and halftone dots. All locations that are marked as fine edges but not as coarse edges serve as initial estimates of halftone dots. Such locations are counted around each pixel and the result thresholded in order to determine halftone pixels. Coarse edges on detected halftone regions and fine edges on non-halftone regions make up two of the labels in the X field. In another embodiment, a variance is calculated around each non-halftone pixel to determine if that pixel is over a constant-tone region. As a result of this process we have the five possible labels in Table 1.

Once labeling is done, edge enhancement is carried out on detected coarse and fine edge pixels and descreening is accomplished by low pass filtering the halftone pixels. Descreening involves low pass filtering, therefore the scanned document is segmented or decomposed to its constituent halftone and non-halftone regions in order not to corrupt high resolution text and graphics with low pass filtering. The embodiments described below accomplish this segmentation and combining it with error tolerant descreening and enhancement in a very low complexity environment. In one embodiment, bleed-through removal is applied to the enhanced data. As will be explained in more detail below computations may be reused in the enhancement stage, which in turn share some of the computational results of the labeling stage.

FIG. 2 is a simplified schematic diagram illustrating a copier pipeline configured to execute the segmentation, labeling and selective enhancement functionality in accordance with one embodiment of the invention. Image replication device 108, e.g., a copier, includes scanner module 110, integrated enhancement module 112, and printing module 120. The data coming in from scanner module 110 is labeled, descreened, and enhanced through labeling module 114, descreening module 116, and text/graphics enhancement module 118, respectively. The processed data is output together with the detected per-pixel labels to printing module 120. It should be appreciated that the labels comprise an extra channel in addition to the RGB channels in the output stream that is referred to as the X channel or X field. In one embodiment, the X channel is configured to aid further operations in the printing pipeline that may benefit from the labeling, e.g., the adaptive determination of printer halftone screens, resolution improvement operations, etc. Of course, the RGB data stream is exemplary and the functionality described herein may operate on other types of color documents, as well as on grayscale documents and on black and white input. Table 1 illustrates the exemplary per-pixel labels (X field) detected at the labeling stage of the algorithm and summarizes the labels used for the X field in one embodiment of the invention. It should be appreciated that the detected edges are those edges determined to be due to image edges, text, graphics, etc. That is, the detected edges are not due to the halftone dots.

TABLE 1

| | |
|---|---|
| FINE EDGE | A detected edge pixel over a non halftone region in the document. |
| COARSE EDGE | A detected edge pixel over a halftone region in the document. |
| HALFTONE | A detected (non-edge) halftone pixel in the document. |
| CONSTANT TONE | A detected constant-tone pixel over a non halftone region in the document. |
| OTHER | Marks all the remaining pixels in the document. |

It should be appreciated that the technique described herein, also referred to as an algorithm, makes no attempt at distinguishing among edges due to text, graphics, images, etc. While the primary application of the functionality is the accomplishment of the labeling and enhancement for a copier pipeline, the results of the algorithm may be used in conjunction with more sophisticated algorithms, e.g., optical character recognition, etc., to enable further document processing and segmentation. Similarly, the labeling results may be used to derive other applications such as the compression of compound documents, etc.

It will be apparent to one skilled in the art that there are many other operations that may be performed on the output stream as it progresses in the printing pipeline of printing module 120. For example, in some modular copying applications, where the scanner and printer are well separated, it may be desirable that the deployment of the labeling, descreening, and enhancement algorithm not require any changes in the printing pipeline. On the other hand in applications where scanner-side and printer-side algorithms are jointly designed, the technique must be flexible enough not to curtail the possible savings introduced by the joint design. This flexibility is provided through the embodiments described herein. For example, the technique may operate on raw scanner output without requiring extra color correction, thereby allowing separate scanner and printer color correction to be combined for computational savings. Furthermore, the output X channel may be suppressed in modular applications. The technique may thus be incorporated in the scanner-side or the printer-side in order to give a system designer freedom to best take advantage of cost, complexity, and performance tradeoffs.

As is generally known, printers use screens to generate an image to be printed. Therefore, if text regions and graphics/image regions are identified, the printer may apply a lower frequency screen to an image region in order to get better color production. On the other hand, the text regions may use high frequency screens in order to make the text appear sharp. Thus, by providing the optional X field to a printer module, the printer module could then execute functionality on top of the enhanced image data provided by the embodiments described herein to further enhance the image for printing.

Figure 3:
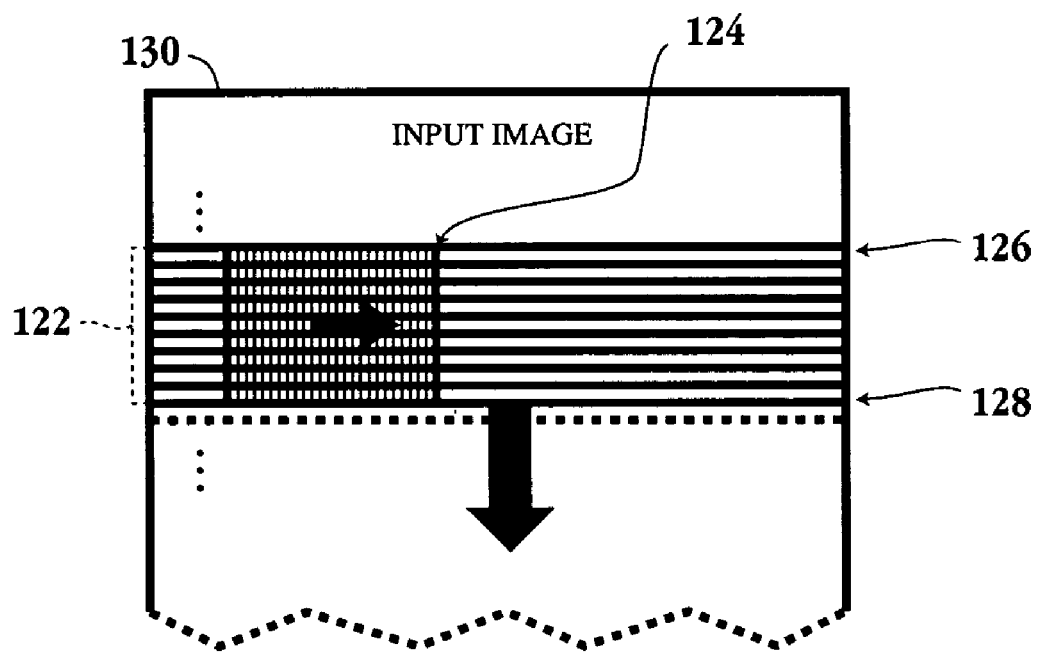
FIG. 3 is a simplified schematic diagram illustrating the banded nature of the technique to minimize memory resources in accordance with one embodiment of the invention.

FIG. 3 is a simplified schematic diagram illustrating the banded nature of the technique to minimize memory resources in accordance with one embodiment of the invention. Operating in a banded fashion refers to having a relatively small number of rows stored in memory and all processing is done on the stored rows. As logically represented in FIG. 3, band of stored rows 122 in memory 130 moves over the input, creating one row of output for each row of input. However, it should be appreciated that the algorithm is not limited to banded processing as any suitable processing scheme may be utilized. Shaded region 124 inside band of rows 122 denotes the active region used in processing which slides from left to right within band of stored rows 122 as the columns in the band are processed. In one embodiment, at any point in the processing loop only information that is within active region 124 is utilized. The limited extent of active region 124 assists in curbing the active memory requirements associated with the technique and also allows integration within systems that perform block-based rather than band-based processing. Depending on the various parameters, the number of stored rows may change. For the 600 dpi examples in this paper, the algorithm is configured to store 17 rows and the active region corresponds to approximately 17×257=4,369 pixels. Compared to full page memory at 600 dpi given by 8.5×11× 600×600=33,660,000 pixels, in banded operation the algorithm requires storage on three buffers over 17×8.5×600=86,700 pixels which is about 0.8% of full page memory. The active region used by the algorithm is about 0.01% of full page memory. Thus, the thickness of the rows stored by the algorithm (i.e., the size of the band in row dimension) is comparable to the size of a full-stop in 11 pt or 12 pt text. It should be appreciated that the embodiments described herein are not limited to a banding scheme where 17 rows are used. When banded processing is used any suitable number of rows may be employed.

It should be appreciated that the technique described herein is configured to perform a single pass on the input and once the band reaches the bottom of the input page, the output page (which includes the enhanced input and the optional X field) is ready up to a few rows of delay. Accordingly, the operation of this algorithm may be analogized to a very thin line that rapidly scans an input page while simultaneously producing an output page. The memory requirements and memory-bandwidth requirements of the algorithm are minimal due to the banded operation with small active memory. This architecture, in conjunction with the utilized low complexity algorithms, allows very fast processing at a very low cost.

In one embodiment, the algorithm maintains three main buffers that store information corresponding to pixels that are within the band of FIG. 3. These three buffers store relevant portions of the input image, the low pass filtered version of these portions, and per-pixel labels that have been assigned to these portions. Each stage of the algorithm is described in more detail below with exemplary results of the corresponding stage illustrated on an example document. Color channels in the input document are processed in turn. The primary target of the algorithm is 600 dpi processing, however, in order to demonstrate the flexibility of the algorithm, the various parameter values may be adjusted to other suitable dpi resolutions. It should be appreciated that there may be places where the algorithm makes labeling mistakes. While many of these mistakes may be corrected using straightforward processing, such as median filtering, region completion, etc., it is important to note that the utilized enhancement methods are robust to these errors as described in more detail below, thereby making special processing for these corner cases redundant.

The technique is designed around the observation that the main information in documents is meant to be visible to human observers viewing the documents from a certain distance. Accordingly, the coarse resolution image should contain the bulk of this information and it can be used to identify the information bearing portions at the fine resolution. Therefore, most of the influence of real document edges may be subtracted, through the coarse resolution, and segmentation and identification decisions may be based on relatively simple statistics where the alternative hypothesis are halftone and non-halftone. In contrast, traditional techniques have to base statistical decisions on complex statistics where they have to distinguish among real document edges, non-halftone areas, and halftone areas. Depending on the language, characters, fonts, etc., text and halftone regions can have remarkably similar statistics which limits the robustness of these traditional techniques. Consequently, the algorithm is much more robust and it is applicable over a variety of text and graphics regions, since most of the visual information that is meant to be seen in the input document never enters the statistical decision process to cause mistakes. Similarly, the technique discussed herein incorporates robustness in terms of the types of halftones it may detect since, the halftones are primarily located as regions that have densely packed but invisible information.

Figure 4A:
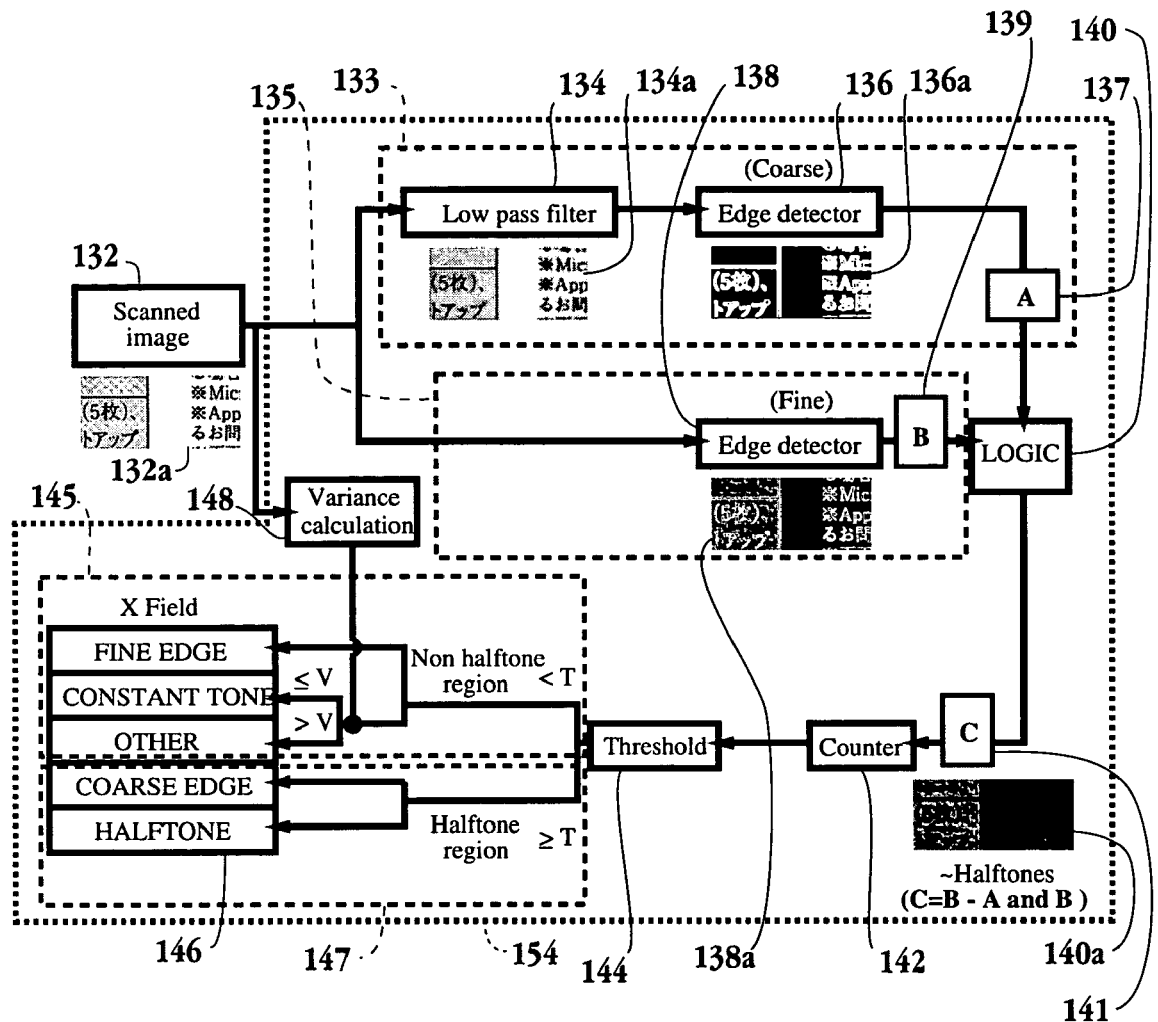
FIG. 4A is a simplified schematic diagram of the labeling process with exemplary images provided for illustrating the effects of the processing in accordance with one embodiment of the invention.

FIG. 4A is a simplified schematic diagram of the labeling process with exemplary images provided for illustrating the effects of the processing in accordance with one embodiment of the invention. Scanned image document 132, a portion of which is represented by image 132a, is provided to processing branches 133 and 135. Processing branch 133 processes scanned image 132 through low pass filter 134. The output of low pass filter 134 is input into edge detector 136 which is configured to detect coarse edges. It should be appreciated that low pass filter 134 yields a blurred document as illustrated by image portion 134a. In essence, low pass filter 134 suppresses halftones, since high frequency data is filtered out by the low pass filter. In other words, low pass filter 134 function similar to a human eye in that it detects only low frequency data. Consequently, edge detector 136 detects coarse edges that a human eye would detect. In one embodiment, text, lines, and text on halftone is picked up by edge detector 136. A portion of the image output from edge detector 136 is illustrated by image portion 136a.

Processing branch 135 of FIG. 4A differs from processing branch 133 in that processing branch 135 does not include a low pass filter. Consequently there is no suppression of halftones through processing branch 135. Here, text as well as half tones are picked up through edge detector 138, illustrated by image portion 138a. Thus, processing branch 133 performs the processing at a lower frequency resolution, while processing branch 135 performs the processing at another frequency resolution, e.g., the original resolution of scanned document 132. It should be appreciated that if only processing branch 135 was used without processing branch 133 then the uniform enhancement of the output from edge detector 138 would enhance the halftones as well as detected edges.

Still referring to FIG. 4A, processing branch 133 outputs low pass filtered image data that has coarse edges detected, represented as image A box 137. Processing branch 135 outputs image data that has fine edges detected, represented as image B box 139. The data representing image A box 137 and image B box 139 are combined through logic module 140. In one embodiment, the data is combined through a simple AND operation. It should be appreciated that the combination of the data representing image A box 137 and image B box 139 yield image data in which the real edges are highlighted, as described in more detail with reference to FIG. 4B. Logic module 140 takes the ANDed output of image A 137 and image B 139 and subtracts the ANDed output from image B 139 to yield data representing image C box 141. It should be appreciated that whenever there is a real text edge in image portion 138a, the corresponding location in image portion 136a also is a real text edge. However, where there is a halftone edge in image portion 138a, there will be no corresponding edge in image portion 136a. Therefore, through the AND operation where there is a "1" in corresponding locations of image portions 136a and 138a, the AND output is "1." Where there is a "0" in either of image portions 136a and 138a, then the AND output is "0". Therefore, the real edges are highlighted because halftones are not visible in image portion 136a. In turn, when the ANDed output of the data representing image portions 136a and 138a are subtracted from the data representing image portion 138a, the result corresponds to all the locations that are halftone regions.

Figures 1, 4B:
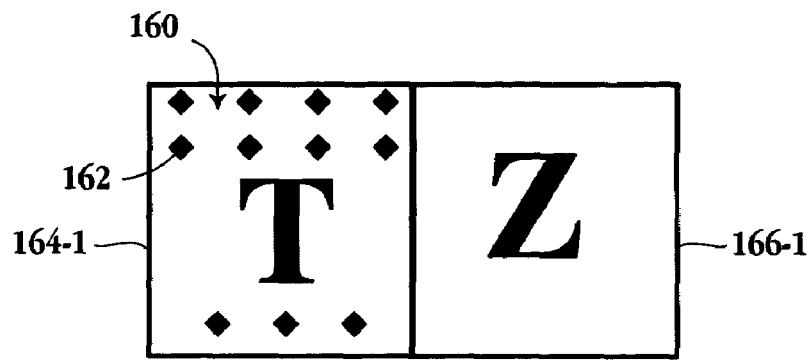
FIGS. 4B1 through 4B4 illustratively represent the logical AND operation and the subtracting operation discussed above with reference to FIG. 4A.
Figures 2, 4B:
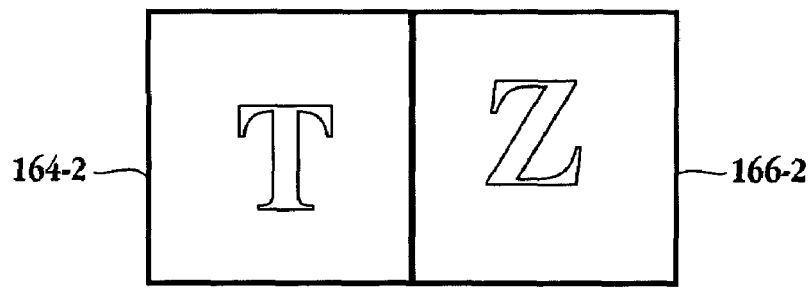
Figures 3, 4B:
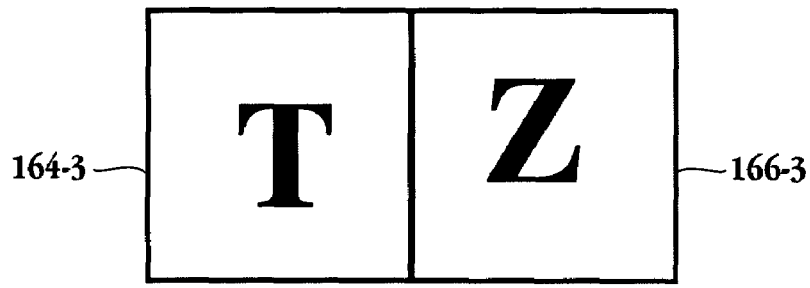
Figures 4, 4B:
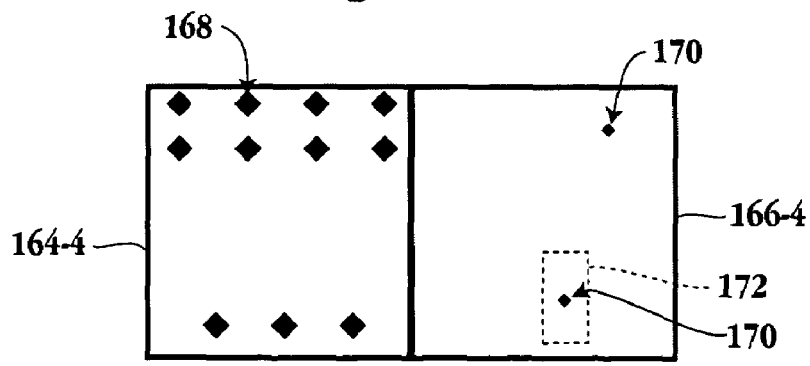

FIGS. 4B1 through 4B4 illustratively represent the AND operation and the subtracting operation discussed above with reference to FIG. 4A. FIG. 4B1 corresponds to image portion 138a of FIG. 4A. Here, the text (T) is over halftone region 164-1. Region 164-1 includes halftone dots 162 as the halftones are not suppressed, while region 166-1 corresponds to a continuous tone region. The halftone dots are associated with a logical "1," while remaining points are associated with a logical "0." FIG. 4B-2 corresponds to image portion 136a in that the low pass filter has been applied to suppress halftones, therefore, there are no halftone dots as in FIG. 4B-1. However, the text images, i.e., "T" and "Z," of halftone region 164-2 and continuous tone region 166-2, respectively, are somewhat blurred due to the low pass filter operation.

FIG. 4B-3 represents the result of the AND operation between the data representing FIGS. 4B-1 and 4B-2. One skilled in the art will appreciate that the AND operation replicates the "T" in halftone region 164-3 and the "Z" in continuous tone region 166-3. That is wherever a logical "1" exists in corresponding regions of FIGS. 4B-1 and 4B-2, an edge is defined is FIG. 4B-3. It should be appreciated that the text images are sharper than in FIG. 4B-2, but not quite as sharp as in FIG. 4B-1, and that the halftone dots from FIG. 4B-1 have been eliminated. FIG. 4B-4 represents the subtraction of the data from the AND operation, i.e., FIG. 4B-3, from the data where the halftones have not been suppressed, i.e., FIG. 4B-1. It will be apparent to one skilled in the art that a dot will be defined through the subtraction operation where there is a "1" in the data image of FIG. 4B-1 and a "0" in the data image representing the AND operation, i.e., FIG. 4B-3. Thus, the operation described with reference to FIGS. 4B-1 through 4B-4 represent a method for effectively selecting halftone dots. It should be appreciated that there may be some mistakes in picking up the real edges, e.g., dots 170 of FIG. 4B-4. However, the remaining functionality discussed below addresses the correction of these errors.

Returning to FIG. 4A, the image data represented by image box C 141, e.g., image portion 140a, is communicated to counting module 142, where a counting algorithm is executed. The counting algorithm establishes a neighborhood at each pixel associated with the image data of image box C 141. For example, region 172 of FIG. 4B-4 represents the neighborhood around the pixel corresponding to dot 170. The counting algorithm will then go and count the ones in that neighborhood. If the value associated with the number of counted ones is greater than a threshold of threshold module 144, then the corresponding pixel is in a halftone region. If the value associated with the number of counted ones is less than a threshold value, then the corresponding pixel is not in a halftone region. The threshold may be determined experimentally, e.g., through running experiments to determine an optimum threshold. In another embodiment, the threshold is effectively the density of halftone dots. Therefore, where the resolution is known, i.e., the number of halftone dots in a neighborhood may be determined, the threshold may be calculated based on this determination. It should be appreciated that the counter is configured to correct any mistakes through the neighborhood application as discussed earlier.

The output of threshold module 144 of FIG. 4A is communicated to either branch 145 or branch 147. If a pixel is associated with a halftone region, then the pixel will either be labeled as a coarse edge, i.e. an edge on a halftone, or just a halftone. In one embodiment, the determination of whether the pixel is a coarse edge or a halftone is made by checking the output of edge detector 136. That is, if edge detector 136 picked up a logical "1" for a point associated with that pixel, then that pixel is a coarse edge. Otherwise, the pixel is labeled as a halftone. For branch 145, the non halftone region, the determination of whether the corresponding pixel is labeled as an edge is made by checking the output of edge detector 138. If the corresponding pixel is labeled as an edge in the output of edge detector 138, then the pixel is labeled as a fine edge, an edge in a non-halftone region. If the corresponding pixel is not labeled as an edge in the output of edge detector 138, then variance calculation module 148 is utilized to define a label for the corresponding pixel.

Variance calculation module 148 of FIG. 4A is configured to determine whether non-halftone regions are disposed over slowly varying portions of the document, i.e., basically constant regions of the document such as constant color regions. It should be appreciated that bleed-through, the incorporation of shading from the backside of a document interfering with the copying of a front side of the document, is substantially eliminated through the application of variance calculation module 148. Here again, a neighborhood is established around the corresponding pixel, then the mean and variance are calculated for the pixels in that neighborhood. If the variance is below a threshold variance, then the pixels in the neighborhood are slowly varying, i.e., they are close in value together. Thus, the pixel is labeled as a constant tone pixel. If the variance is greater than a threshold variance, then the pixel is labeled as an other pixel. That "other" pixel label will be described in more detail below. It should be appreciated that box 146 represents the various labels for the X field in one embodiment of the invention. In addition, the labels are meant to be illustrative and not limiting.

It will be apparent to one skilled in the art that the functionality described with reference to box 154 of FIG. 4A may be incorporated into a microprocessor, i.e., embodied as hardware for an image replication device. For example, the functionality may be provided through a plug-in board, or the like, having a microprocessor configured to perform the above described functionality. Alternatively, the functionality may be provided in the form of software code embodied in a driver that may downloaded to an image replication device over a distributed network, e.g., the Internet. Thus, the embodiments described herein may be captured in any suitable form or format that accomplishes the functionality described herein and is not limited to a particular form or format.

The two stages of the algorithm, i.e., labeling and enhancement/descreening are discussed below. The algorithm is primarily based around the labeling stage with the enhancement stage strongly coupled to labeling for added robustness and computational simplicity. As used below let $S(i,j)$, $i=0, \ldots, N-1$, $j=0, \ldots, M-1$ denote a color channel in the original input.

The algorithm uses a set of internal labels that are assigned to pixels through independent classification stages that operate on each color channel of the input. A buffer maintains the results of the independent classifications and these results are combined at the final decision stage to assign a final label for all the color channels in each pixel. It should be appreciated that until the final decision stage, a pixel may have several attached labels for each color channel. The input is initially low pass filtered to yield a coarse resolution image as illustrated in FIGS. 5A and 5B via the following equation:

$$L(i,j)=G(i,j)*S(i,j) \quad (1)$$

where * denotes convolution and $G(i, j)$ is the utilized low pass filter. As mentioned above, the algorithm performs edge detection on the low pass filtered data to determine the locations of the real document edges. Hence, it becomes important for the low pass filter to suppress the halftone dots that are present in the document to the degree that these dots are not falsely detected during coarse edge detection. Another issue in the choice of the filter concerns the alignment of detected edges. Since edge detection at coarse and fine scales are used in halftone detection, the detected edges at the two scales should align in order to avoid complex logic in the implementation.

In one embodiment, the alignment requirement is met by using symmetric, zero-delay filters. This also reduces the number of multiplications that are required to calculate the filtered value. The suppression of the halftone dots is not as constraining on the design and the robustness of the design. Halftones may be detected in the input to the degree that they are likely to cause Moiré artifacts in the final printed output. Hence, halftone-like features below a certain frequency need not be detected and therefore need not be suppressed by the filter. It should be appreciated that the exact frequency at which this occurs is device specific and depends on the printer used in the copier system, the utilized halftoning method, etc. Furthermore, the halftones present in the input document are designed to be invisible to observers viewing the document from a certain distance. These factors allow straightforward decisions on the choice of the bandwidth of the filter based on the dpi resolution of operation. Very good performance has been experienced using a symmetric Gaussian filter with the bandwidth chosen at 600 dpi and where this bandwidth is adjusted linearly for other target dpi resolutions. For example if the standard deviation of the Gaussian filter is set to $\sigma_g=2$ at 600 dpi, then the standard deviation of the filter at 300 dpi is set to 1, etc. Note that since a copier device is expected to operate at a fixed set of resolutions, one can also utilize different filters for each resolution with the filter bandwidths adjusted using a training set at each resolution. All the 600 dpi illustrated herein utilize a symmetric, separable, 7×7 Gaussian filter of standard deviation $\sigma_g=2$.

After low pass filtering, coarse edge detection is carried out on the low pass filtered image using straightforward edge detection as illustrated in FIGS. 6A and 6B. FIG. 6A illustrates the low pass filtered image of FIG. 5B which corresponds to the output of operation 134 with reference to FIG. 4. FIG. 6B illustrates detected coarse scale edges of the low pass filtered images and corresponds to the output of operation 136 with reference to FIG. 4A. In order to combat the rare occurrence of unsuppressed halftone dots being detected as edges, the detected edge labels are processed to remove mistakes that manifest themselves as an isolated pixel labeled as an edge. This step is typically only required if the input is expected to contain very low frequency halftones but in a limited fashion it also serves to reduce the dependency on the threshold used in the edge detection.

The edge detection threshold may be adjusted experimentally so that most of the real edges in documents are detected. In one embodiment, the threshold is dependent on the color contrast characteristics of the scanner and whether color correction has been done on the scanned data. The examples used herein are on raw scanner output with no color correction. For the examples we have utilized the directional edge filters given by:

$$E_h(i, j) = \begin{bmatrix} .25 \\ .50 \\ .25 \end{bmatrix} \times [\, -1 \quad 1 \,], \quad E_v(i, j) = \begin{bmatrix} -1 \\ 1 \end{bmatrix} \times [\, .25 \quad .50 \quad .25 \,] \quad (2)$$

for horizontal and vertical edge detection, respectively. The absolute values of results of filtering with these filters was thresholded using the threshold $T_{thick}=3$ at 600 dpi (300 dpi processing uses the same threshold). An edge is declared if the absolute value output of either of the filters passes the threshold, i.e., given by:

$$D_{c,h}(i,j)=E_h(i,j)*L(i,j), D_{c,v}(i,j)=E_v(i,j)*L(i,j) \quad (3)$$

there is a coarse edge at pixel (i, j) in the representative channel if $A(i, j)=1$ where $$A(i, j) = \begin{cases} 1 & |D_{c,h}(i, j)| \geq T_{thick} \text{ or } |D_{c,v}(i, j)| \geq T_{thick} \\ 0 & \text{otherwise} \end{cases} \quad (4)$$

One of the key problems with traditional techniques in the enhancement of edges over halftones is the thickness of the detected edges. Often times, it may be desirable to restrict enhancement to "thinned" edges whereas halftone decisions are still made with the "thick" labels. In order to accommodate such enhancement concerns two thresholds are utilized and distinguished between thick and thin coarse edges using two labels, i.e., a pixel that passes both thresholds is marked as thick and thin. Thick edges are utilized in halftone decisions whereas, as described below, a selective combination of thick and thin edges are utilized in enhancement.

The larger threshold used to mark thin edges is given by $T_{thin}=7$ at 600 dpi ($T_{thin}=11$ at 300 dpi).

As pointed out above there is a need to distinguish between thick and thin coarse edges in order to accommodate enhancement concerns. While halftone detection proceeds by utilizing thick coarse edges, i.e., the determination of halftones utilizes the small edge detection threshold $T_{thick}$, applying the enhancement process to the identified thick coarse edges produces low quality results. This is because detection with the small threshold $T_{thick}$ is not very good at identifying the precise location of coarse edges. Thin edge labeling with the larger threshold $T_{thin}$ is much more accurate in determining these locations, however, with the unfortunate tendency to miss details which is again a concern in the enhancement.

FIGS. 7A–7E are schematic diagrams illustrating an edge proximity technique for detecting missed edges during coarse edge detection on a schematic text character in accordance with one embodiment of the invention. FIG. 7A represents an exemplary text, e.g., a kanji character. When a low pass filter is applied to such a character, only the outer boundary of the letter may be detected. It should be appreciated that the inner edges may appear as high frequency structures and the low pass filtering causes the edges to be blurred and even merged with a top outer boundary. As shown in FIG. 7B, coarse edge detection with the large threshold (thin coarse edges) can miss some salient edges in region 180 and only capture outer boundary 182, which may cause problems in edge enhancement over halftone regions. On the other hand, in FIG. 7C it can see that coarse edge detection with the small threshold (thick coarse edges) tends to mark too many pixels around edges, i.e., the edges end up being more blurred and more points are being labeled as edges with respect to the outer boundary edges, which is also a concern if enhancement is to be restricted to thick coarse edges in halftone regions. It is preferable to enhance the edges of the edge map of FIG. 7B rather than the edge map of FIG. 7C, since FIG. 7C includes points outside of the edge of the text.

In one embodiment, the edge information from the missed region 180 is determined from FIG. 7C and combined with FIG. 7B in order to accurately define all the edges. FIG. 7D illustrates the results of the application of proximity processing being applied to FIG. 7C. For proximity testing, a thick edge in FIG. 7C is examined to determine all the thick edges that have at least two thin edge strokes within a defined proximity as discussed below. This may be accomplished by identifying thick edges that are close to two or more detected thin edges or strokes (i.e., close to those passing the threshold $T_{thin}$) as shown in FIG. 7D and as discussed below. The identified pixels are treated as thin coarse edges in enhancement (FIG. 7E). It should be appreciated that the results of this process only affects enhancement stages since halftone detection effectively utilizes both thin and thick coarse edges.

Around each thin coarse edge pixel, we use a temporary label to mark a symmetric $(+/-N_{prox})$ rectangular proximity region of size $(2 N_{prox}+1) \times (2 N_{prox}+1)$ pixels. Then, given a thick coarse edge pixel, $N_{prox}$ pixels are checked with respect to the pixel's immediate left to determine if all pixels are marked with the temporary label. A similar check is performed on $N_{prox}$ pixels to the immediate right, above, and below. The pixel is then activated, i.e., labeled as a "secondary" thin edge pixel, if all four proximity checks pass and the pixel itself is marked with the temporary label. The "secondary" labeling is implemented in a fashion to ensure that only the threshold-passing thin edges are used in establishing the proximity regions. Of course, in the enhancement stage secondary thin edges are treated as thin edges and undergo enhancement.

Setting $N_{prox}$ to a large number would invoke the risk of broadening thin edges significantly on dense text regions where different text characters are at close proximity. $N_{prox}$ is thus set to a small number, $N_{prox}=3$ at 600 dpi, so that the procedure results in the broadening of thick edges only to the extent that helps the detection of missed salient edges (setting $N_{prox}=3$ also provides acceptable performance at 300 dpi).

FIGS. 8A and 8B illustrate an original scanned image portion and a corresponding labeled fine scale image portion, respectively, in accordance with one embodiment of the invention. FIG. 8A corresponds to an original scanned image scanned at 600 dpi. FIG. 8B corresponds to the output of operation 138 with reference to FIG. 4, where the white pixels represent detected edges. Fine edge detection is established through the filters of Equation (2) via:

$$D_{f,h}(i,j)=E_h(i,j)*S(i,j),\ D_{f,v}(i,j)=E_v(i,j)*S(i,j) \quad (5)$$

And there is a fine edge at pixel (i,j) in this representative channel if $B(i,j)=1$ where $$B(i,j) = \begin{cases} 1 & |D_{f,h}(i,j)| \geq T_{fine} \text{ or } |D_{f,v}(i,j)| \geq T_{fine} \\ 0 & \text{otherwise} \end{cases} \quad (6)$$

It should be appreciated that the threshold used for the examples provided herein is set to $T_{fine}=15$ at 600 dpi ($T_{fine}=15$ also at 300 dpi). However, any suitable threshold may be used.

Halftone detection starts by identifying all the pixels that are marked as fine edges (see FIG. 8B) but not as coarse edges (see FIG. 6B). With the symmetric, zero-delay filters utilized discussed above this determination is reduced to straightforward point-wise logic. Using Equations (4) and (6) we obtain:

$$C(i,j)=B(i,j)\cdot (A(i,j) \text{ AND } B(i,j)). \quad (7)$$

FIG. 9 illustrates an image portion having locations marked as fine edges but not as coarse edges for the example document in accordance with one embodiment of the invention. It should be appreciated that the image represented by FIG. 9 was obtained using data shown in FIGS. 6B and 8B. While this serves as an initial estimate of the halftone dots, this process alone cannot mark halftone regions. As can be seen in FIG. 9, there are pixels on the halftone side that are not marked and there are those in the non-halftone side that are marked. The latter pixels typically correspond to locations where coarse edge detection has failed to mark detail structure on a real document edge.

Figure 10:
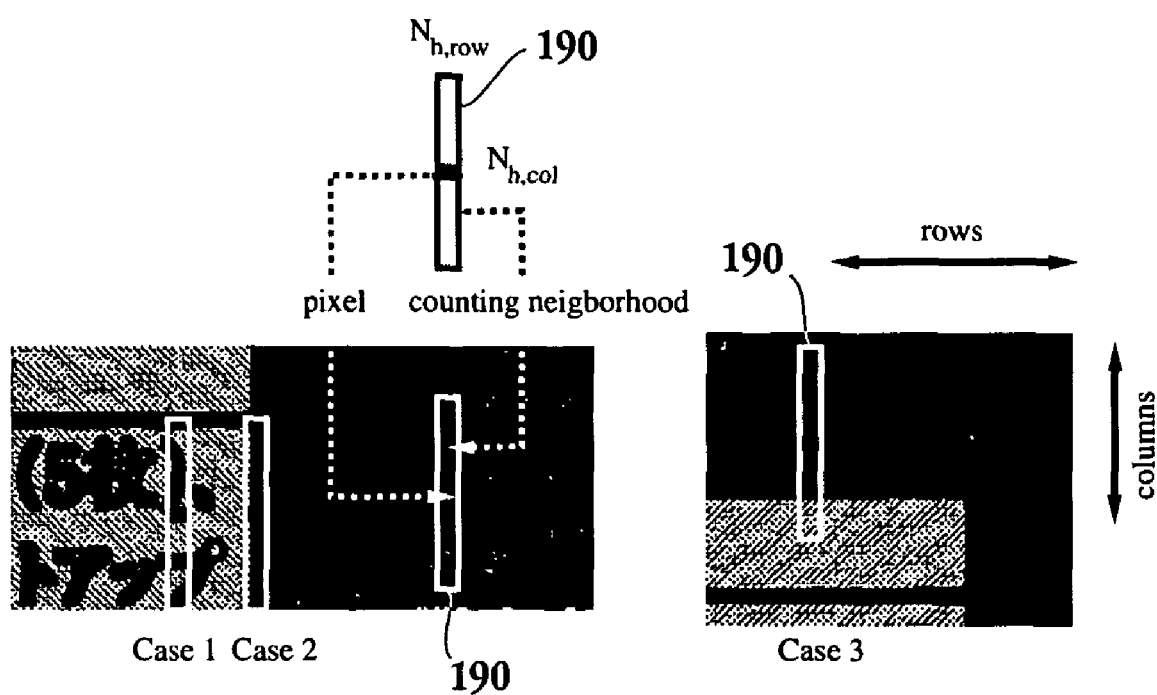
FIG. 10 is a schematic diagram illustrating the counting neighborhood utilized for halftone decisions in accordance with one embodiment of the invention.

FIG. 10 is a schematic diagram illustrating the counting neighborhood utilized for halftone decisions in accordance with one embodiment of the invention. In order to determine whether a pixel is over a halftone region or not, a rectangular counting neighborhood 190 is defined around the pixel and the number of locations that are marked in the initial estimate are counted. This count is compared to a threshold $T_{cnt}$ which determines the minimum halftone density over the neighborhood. If the count is above the threshold then the pixel around which the count is established is a suspected halftone pixel, however, as will be discussed below, the constraints that affect the selection of the threshold $T_{cnt}$ and the size and shape of the counting neighborhood need to be accounted for before a full determination.

By nature of the banded operation, the neighborhood used in the count is necessarily larger over columns then it is over rows (this follows since the algorithm tries to store as few rows as possible). The length of this neighborhood over columns effectively determines the length of the active region with reference to FIG. 3. At 600 dpi a symmetric total length of $N_{h,col}2\times128+1=257$ pixels is utilized over the columns around the current pixel. At 300 dpi this is reduced to a total of $N_{h,col}=2\times64+1=129$ pixels over the columns around the current pixel. The maximum size of the neighborhood over rows is set to 11 pixels.

Still referring to FIG. 10 the neighborhood is superimposed on various pixels in the example of FIG. 9, as well as on another example (from FIGS. 11A–11D, which shows a different portion of the same document) in order to outline three important cases that influence the counting methodology. The direction of the rows and columns is as indicated in FIG. 10. First observe that the threshold $T_{cnt}$ cannot be set too high. As illustrated for Case 1, there are halftone pixels whose neighborhoods overlap detected coarse edges and too high a threshold will cause a miss over such pixels. Since coarse edge detection will invariably miss detail features in real edges, say over text-on-non-halftone portions of the document, counting only over pixels that are not coarse edges and using a normalization scheme runs the risk of incorrectly labeling portions of real edges over non-halftone regions as halftone. However, as seen on Case 2 and Case 3, setting a small threshold may result in a false layer of halftones around detected halftone regions. The thickness of this false layer will be particularly pronounced in column direction due to the choice of the geometry of the counting neighborhood (Case 3).

Figure 12:
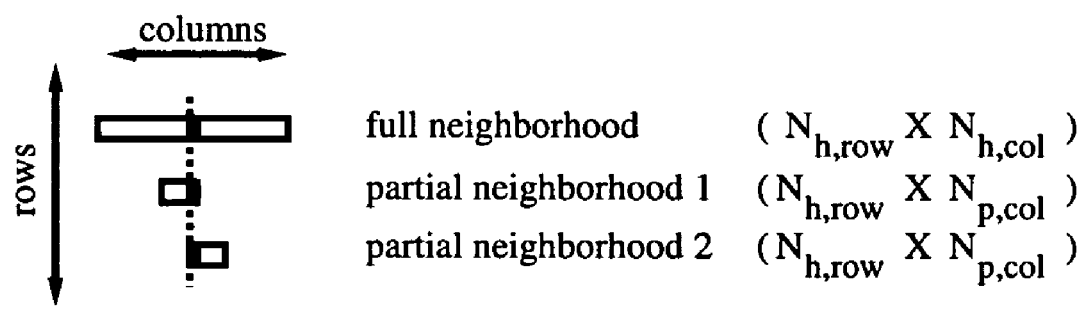
FIG. 12 is a schematic diagram illustrating the partial counting neighborhoods in halftone decisions in accordance with one embodiment of the invention.

In one embodiment, the thickness of this false layer may be significantly reduced by establishing two separate counts over two partial neighborhoods around the current pixel (see FIG. 12). These two counts are also compared to a threshold $T_{p,cnt}$ (obtained by scaling down the main threshold in proportion to the area of the partial neighborhoods) and a halftone pixel is declared if and only if the full count is over the threshold $T_{cnt}$, and at least one of the partial counts is also over $T_{p,cnt}$. For the examples contained herein the column width of the partial neighborhoods is set to $N_{p,col}=32+1=33$ at 600 dpi and $N_{p,col}=16+1=17$ at 300 dpi. In one embodiment, all of the counting is implemented with accumulator buffers in order to avoid spurious computations.

FIGS. 1A–1D represent an original image scanned at 600 dpi, labeled coarse scale edges, labeled fine scale edges, and fine but not coarse edges, respectively. Here, FIG. 11B corresponds to a portion of FIG. 6B, FIG. 11C corresponds to a portion of FIG. 8B, FIG. 11D corresponds to a portion of FIG. 9.

Constant tones are detected by calculating the variance over two neighborhoods around each pixel. The choice of the neighborhoods is similar to the two partial counting neighborhoods used in halftone detection as illustrated with reference to FIG. 12. FIG. 12 is a schematic diagram illustrating the partial counting neighborhoods in halftone decisions in accordance with one embodiment of the invention. This allows rapid transition in detection from other types of regions to constant-tone regions and vice versa. A constant-tone pixel may be declared if the variance over either of the neighborhoods is below a threshold $T_{const}$. The column width of the partial neighborhoods is set to $N_{c,col}=64+1=65$ at 600 dpi and scaled suitably for 300 dpi. The row width is the same as the halftone detection stage and it is set to $N_{c,row}=11$. The threshold $T_{const}$ may be loosely dependent on scanner characteristics and it is set to $T_{const}=9\times9=81$ at both resolutions. It should be appreciated that there may be many device specific factors involved in bleed-through removal processing, e.g., color of the scanner backplane, thickness of paper, etc.

Of course, establishing variance calculations over rectangular regions does not allow constant tones to be detected inside densely populated text regions. Therefore the above detection is followed with an extension technique where non-halftone and non-edge pixels that are connected to an identified constant tone pixel and that are close in color (within $(T_{const})^{1/2}$) are also marked as constant-tones. This enables seamless extension of constant-tones into text regions. However, as will be further discussed below, while regions around text characters will be correctly identified, the holes inside characters may be missed. The effects of this problem are negligible as discussed below.

For each pixel the assigned independent labels are first used to identify a single label for each color channel using Table 2 (in Table 2 the "*" indicates a don't care condition).

TABLE 2

| HALFTONE | COARSE EDGE (THIN) | FINE EDGE | CONST. TONE | LABEL |
| --- | --- | --- | --- | --- |
| 1 | 1 | * | * | COARSE EDGE |
| 1 | 0 | * | * | HALFTONE |
| 0 | 1 | 0 | * | CONDITION 1 |
| 0 | 1 | 1 | * | CONDITION 2 |
| 0 | 0 | 1 | * | FINE EDGE |
| 0 | 0 | 0 | 1 | CONSTANT TONE |
| 0 | 0 | 0 | 0 | OTHER |

These individual labels are then combined to arrive at a final label. It should be appreciated that the thin coarse edges are used in determining the coarse edge labels for each color channel and therefore the final overall label as discussed above. The CONDITION 1 and 2 labels in Table 2 are used as discussed below in order to accommodate cases where a halftone is detected in one channel and a coarse edge in another (such as the case of green text over a red halftone region).

The final label that combines the labeling information for each channel is given as COARSE EDGE label if any channel is marked COARSE EDGE or if one channel is marked HALFTONE and at least one other marked CONDITION 1 or 2. Otherwise, the final label is HALFTONE if any channel is marked as HALFTONE, else FINE EDGE if any channel is marked FINE EDGE or CONDITION 2, else CONSTANT TONE if all channels are marked CONSTANT TONE. If none of these conditions hold then the final label is OTHER. For the discussion below it is assumed that the final label for pixel (i,j) is given as X(i,j).

Figure 11A:
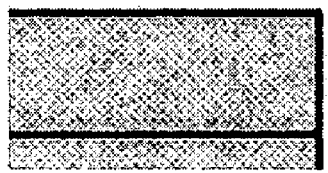
FIGS. 11A–11D represent an original image scanned at 600 dpi, labeled coarse scale edges, labeled fine scale edges, and fine but not coarse edges, respectively.
Figure 11B:
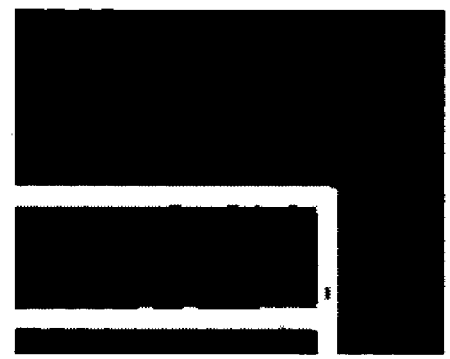
Figure 11C:
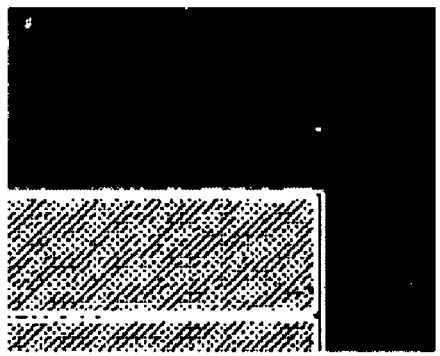
Figure 11D:
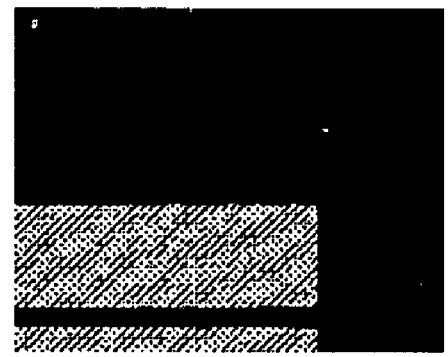

FIGS. 13A and 13B are schematic diagrams illustrating the per-pixel labels obtained for the examples depicted in FIG. 5A and FIG. 11A, respectively. Here, black regions 192 correspond to fine edges, dark gray regions 193 correspond to coarse edges on halftones, gray regions 194 correspond to halftones, light gray region 195 correspond to constant tones, and white regions 196 correspond to pixels labeled other. It should be appreciated that the main segmentation of the various regions is accomplished correctly with some small mistakes due to various limitations discussed above. As can be seen, the halftone segmentation in FIG. 13A is more accurate than in FIG. 13B, which contains a false layer of halftone at the top of the halftone region. This is due to the structure of the halftone detection neighborhoods discussed above, and as can be seen, it is more pronounced in the column direction then it is in row direction. With the partial neighborhoods set to $N_{p,col}=33$ pixels in 600 dpi as discussed above, the adverse effects of the false layer is negligible in conjunction with the error tolerant enhancement procedures discussed with reference to the enhancement and descreening stages. As mentioned above, the constant-tone regions do not extend to holes inside characters with such locations erroneously labeled as OTHER (for example see the inside of the text character "p" in FIG. 13A). Further examples, and properties are described in more detail below.

The enhancement and descreening stage primarily takes into account that the output device is a printer and targets an observation model that is more sensitive to low-pass frequency characteristics especially for the enhancement of coarse edges. However, more elaborate techniques may be used for other scenarios. Enhancement proceeds on color channels independently except for final normalization, where the computed enhancement differentials are jointly scaled to ensure that pixel values in each color channel remain within maximum and minimum limits.

Some labeling mistakes are inevitable, accordingly the embodiments described herein combine simple enhancement with the labeling to achieve very robust performance. A property that enables this robustness is the very similar methods used in the enhancement of coarse and fine edges. Another property that is emphasized in the design is the sharing of computations between the labeling stage described with reference to FIG. 4A and the enhancement stage. For example, the low pass filtered data used in the labeling stage is reused in descreening and enhancement in conjunction with the detected labels. These factors contribute to a robust overall design of very low computational and memory complexity. For the discussion below, P(i, j) denotes the representative channel in the output document.

Descreening is accomplished by inputting the already low pass filtered input values at all the pixels that have been labeled as halftone (See FIG. 14), i.e., using equation (1) yields:

$$P(i,j)=L(i,j), \text{ if } X(i,j)=\text{HALFTONE} \qquad (8)$$

It should be appreciated that this incurs minimal complexity.

At fine edges an unsharp masking procedure, which is generally known, is used by computing a sharpening term that is given by the input pixel value minus the already computed low pass filtered pixel value, i.e., using equation (1) yields:

$$P(i,j)=S(i,j)+-\lambda(S\{i,j\}-L(i,j)), \text{ if } X(i,j)=\text{FINE EDGE} \qquad (9)$$

This again incurs minimal complexity. The sharpening term is multiplied with a sharpening factor and then added to the original pixel value to determine the enhanced output at pixels labeled as fine edges (See FIGS. 14A and 14B which illustrate the original scanned document and the enhanced output, respectively).

The enhancement of coarse edges is very similar to the enhancement of fine edges discussed above and is also carried out using unsharp masking. However, a small (3×3) low pass filter K(i,j) is utilized on the input to obtain:

$$l(i,j)=K(i,j)*S(i,j)$$

The sharpening term is obtained as this value minus the already computed low pass filtered pixel value. The sharpening term is again multiplied with a sharpening factor and then added to the low pass filtered value to determine the enhanced output at pixels labeled as coarse edges, thereby yielding:

$$P(i,j)=L(i,j)+\lambda(l(i,j)-L(i,j)), \text{ if } X(i,j)=\text{COARSE EDGE}. \qquad (10)$$

where we have again used equation (1). For 600 dpi results in this paper the small low pass filter kernel is set to $$K(i,j) = \begin{bmatrix} .25 \\ .50 \\ .25 \end{bmatrix} \times [\,.25 \quad .50 \quad .25\,] \qquad (11)$$

It should be appreciated that this filter should be tuned for optimum performance on the output printer.

As can be seen on the enhancement results in the halftone region with reference to FIGS. 14A and 14B, the described enhancement process on coarse edges results in some visibility of halftone dots close to the edges. In one embodiment, this is intentionally done to generate sharp output since halftone screened printouts of these enhanced results remove this visibility and further processing, e.g., the thinning of edges, and more sophisticated enhancement is not necessary.

The bleed-through removal method is then applied and is meant as an exemplary use of the constant-tone labeling. The bleed-through removal method operates on constant-tone regions and starts by calculating a histogram of all the constant-tone pixels in the processed row (this is essentially at the top row stored by the algorithm). In order to avoid higher dimensional histograms, the histogram is computed on a luminance-like channel or index obtained by averaging the pixel values in each color channel. For each bin in the histogram, the average color of all pixels falling into that bin is stored. In one embodiment, simple checks are performed to ensure widely varying colors do not fall into the same bin due to luminance-like indexing. In order to ensure continuity this histogram is further averaged with a stored "previous" histogram (and its average colors), and the results are utilized as well as stored for the processing of the next row.

Histogram segmentation is then performed and each segment in the histogram is assigned a single representative color given by the conditional average color. The colors of the constant-tone pixels in the enhanced image are tested against these representative colors and those pixels with colors that are within a certain threshold (set to $2\,((T_{const})^{1/2})$) of the corresponding segment's color are assigned the representative color.

Of course, this technique is mainly effective in removing bleed-through artifacts over regions marked as constant-tone. However, it should be appreciated that at the expense of increased memory, constant-tone labeling on halftone regions may be performed as well and bleed-through removal may be carried out on de-screened data. With this simple technique, light bleed-through in extended constant-tone regions is substantially eliminated in the input, where artifacts are the most visible. By tuning thresholds it is possible to combat more aggressive artifacts provided that the histogram segmentation can be done accurately.

Figure 15A:
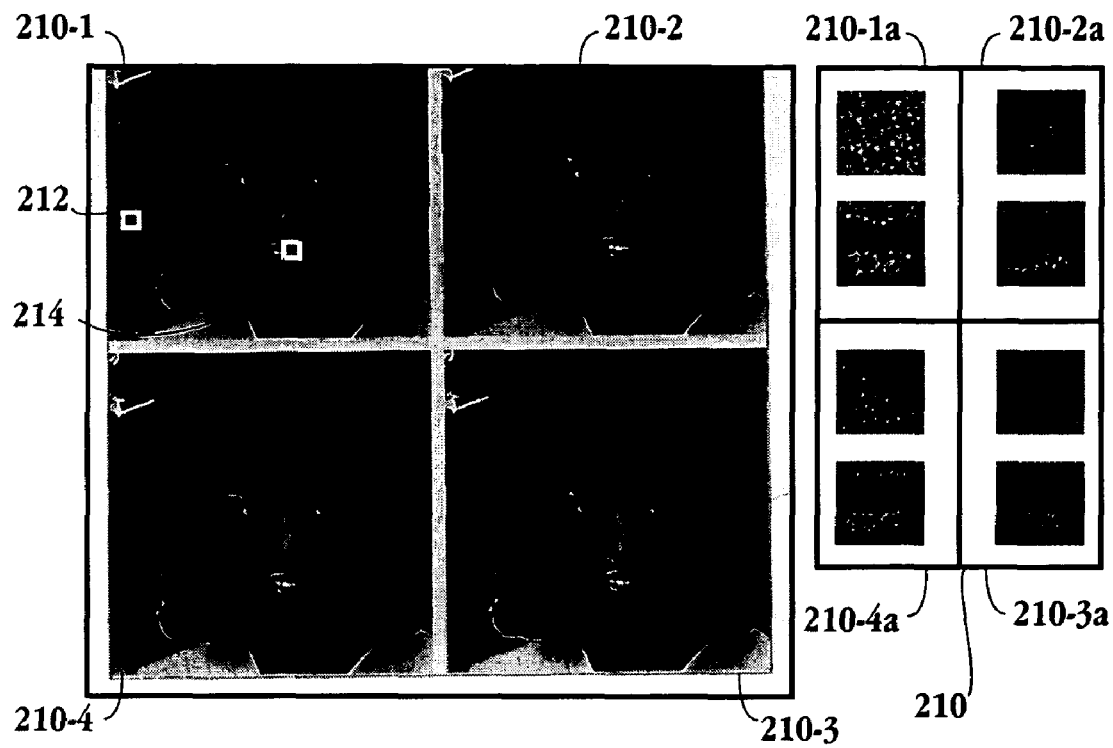
FIGS. 15A and 15B include a series of images illustrating the application of the embodiments described above for detecting different types of halftones in accordance with one embodiment of the invention.
Figure 15B:
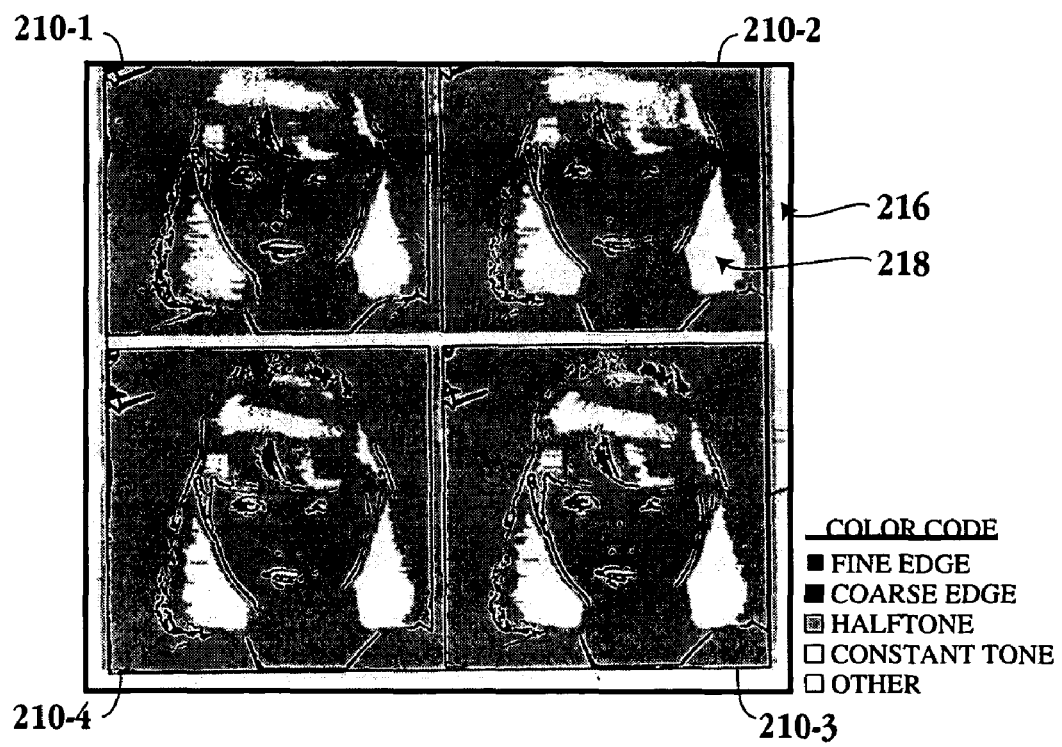

The simulation examples described below provide exemplary applications of the labeling approach embodiments described herein. FIGS. 15A and 15B are exemplary schematic diagrams illustrating the robustness of the algorithm in detecting different types of halftones. More specifically, FIGS. 15A and 15B include a series of images illustrating the application of the embodiments described above for detecting different types of halftones in accordance with one embodiment of the invention. The original scanned image for both FIGS. 15A and 15B 210-1 through 210-4 is a document scanned at 600 dpi containing four halftoned sub-images. As illustrated in box 210 of FIG. 15A, each of four sub-images 210-1a through 210-4a uses a different halftone screen. Image portions 210-1 through 210-4 are scaled to 25% of the original image. In FIG. 15B it should be appreciated that that the labeling obtained by the algorithm is virtually insensitive to the changing halftone screens, and each of the four sub-images 210-1 through 210-4 is labeled in a similar fashion. The main results of the labeling are correct except for the regions identified as Case 1 216 and Case 2 218. Case 1 216 is the situation of a false layer of halftones due to the structure of the halftone detection neighborhoods which has been discussed above. It should be appreciated that Case 1 situations have the potential to give rise to adverse effects if the layer is overlapping fine edges. However, as will be shown, the utilized enhancement stage is robust and minimizes such effects. Adverse effects associated with Case 1 situations are similar to Case 3 situations that are discussed in detail below. Case 2 situations, as identified in FIG. 15B and also in FIG. 16B correspond to the situation of very dark or very light regions inside halftone regions. Such regions do not contain halftone dots and they will be missed if they are of appreciable size since the algorithm strives to keep the relevant neighborhood sizes to a minimum for the above stated complexity, memory, and memory-bandwidth reasons. Of course, Case 2 situations have virtually no effect on the enhanced output since no halftone dots are present to cause artifacts. However, it will be apparent to one skilled in the art that Case 2 situations may be corrected by region analysis algorithms as these errors typically manifest themselves as constant-tone regions surrounded by detected halftones.

FIGS. 16A through 16E, 17A through 17E, and 18A through 18E are exemplary schematic diagrams illustrating the performance of the above described embodiments of the invention on full pages of input. Each one of the examples are chosen to illustrate how the technique handles a challenging compound document type. In each Figure set, the corresponding Figure designations signify the following: (A) show the original, (B) show the labeling obtained by the algorithm, (C) show hand segmented (ground truth) halftone and non-halftone segmentation, (D) show segmentation obtained by the algorithm, and (E) show the enhanced output. The documents are intended to illustrate the main behavior of the algorithm on full pages of input and they are scaled to 25% for display purposes. Example halftone dots from each document are shown on the right bottom of the (A) set of FIGS. Each of the original documents are scanned at 600 dpi.

The halftone portions in each document can be seen in detail on the (C) set of Figures which are the hand-segmented ground truth separation of the page into halftone and non-halftone. In order to calculate quantitative detection probabilities with respect to the ground truth, the halftone and non-halftone segmentation of the documents are shown as obtained by the algorithm in the (D) set of Figures. Of the five labels outputted by the algorithm "COARSE EDGE" and "HALFTONE" constitute pixels over halftone regions whereas the remaining three labels in the X field denote non-halftone pixels. By comparing the (C) and (D) sets of corresponding Figures it should be appreciated that the algorithm detects varying halftones with success.

Figure 16B:
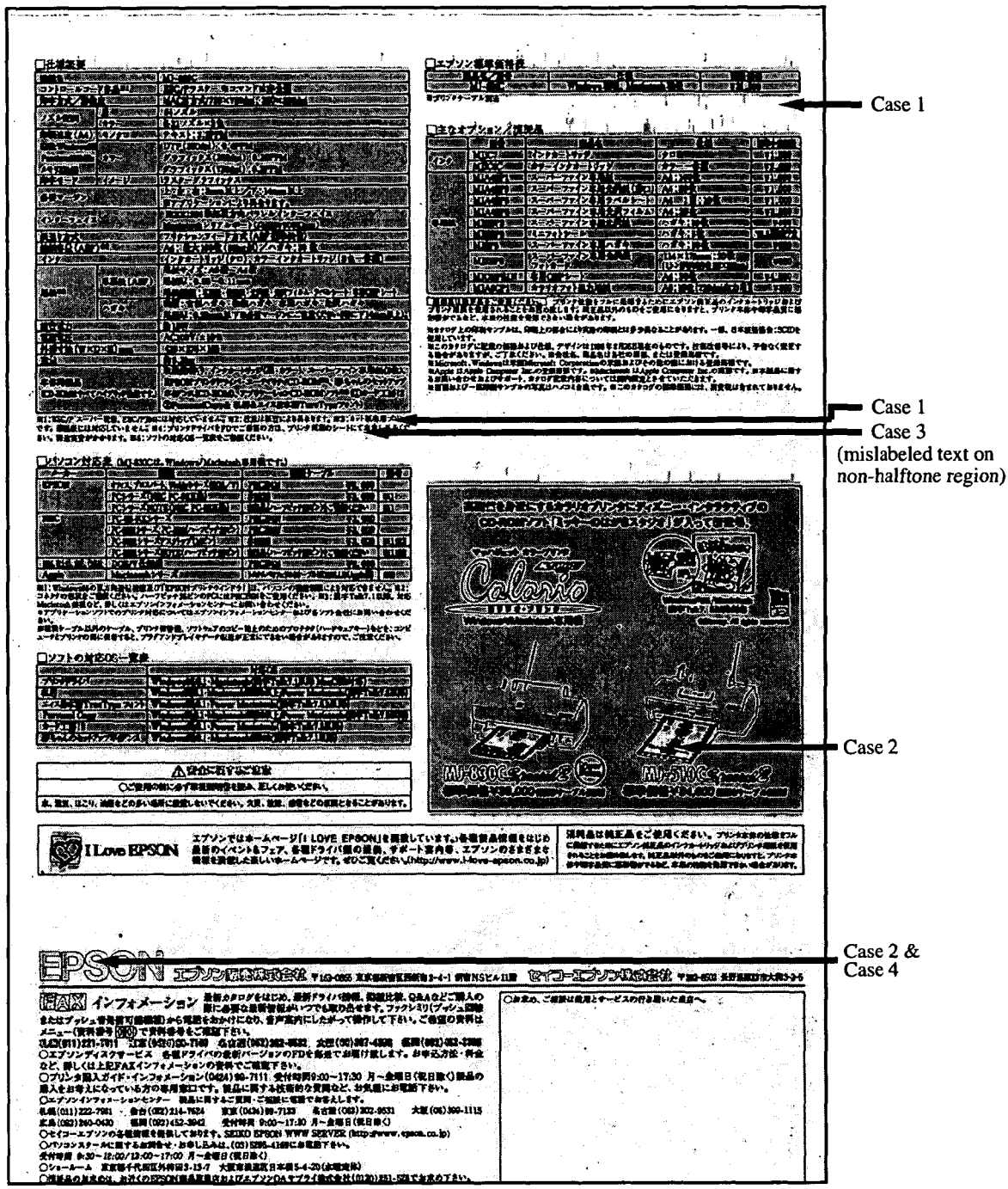
Figure 16C:
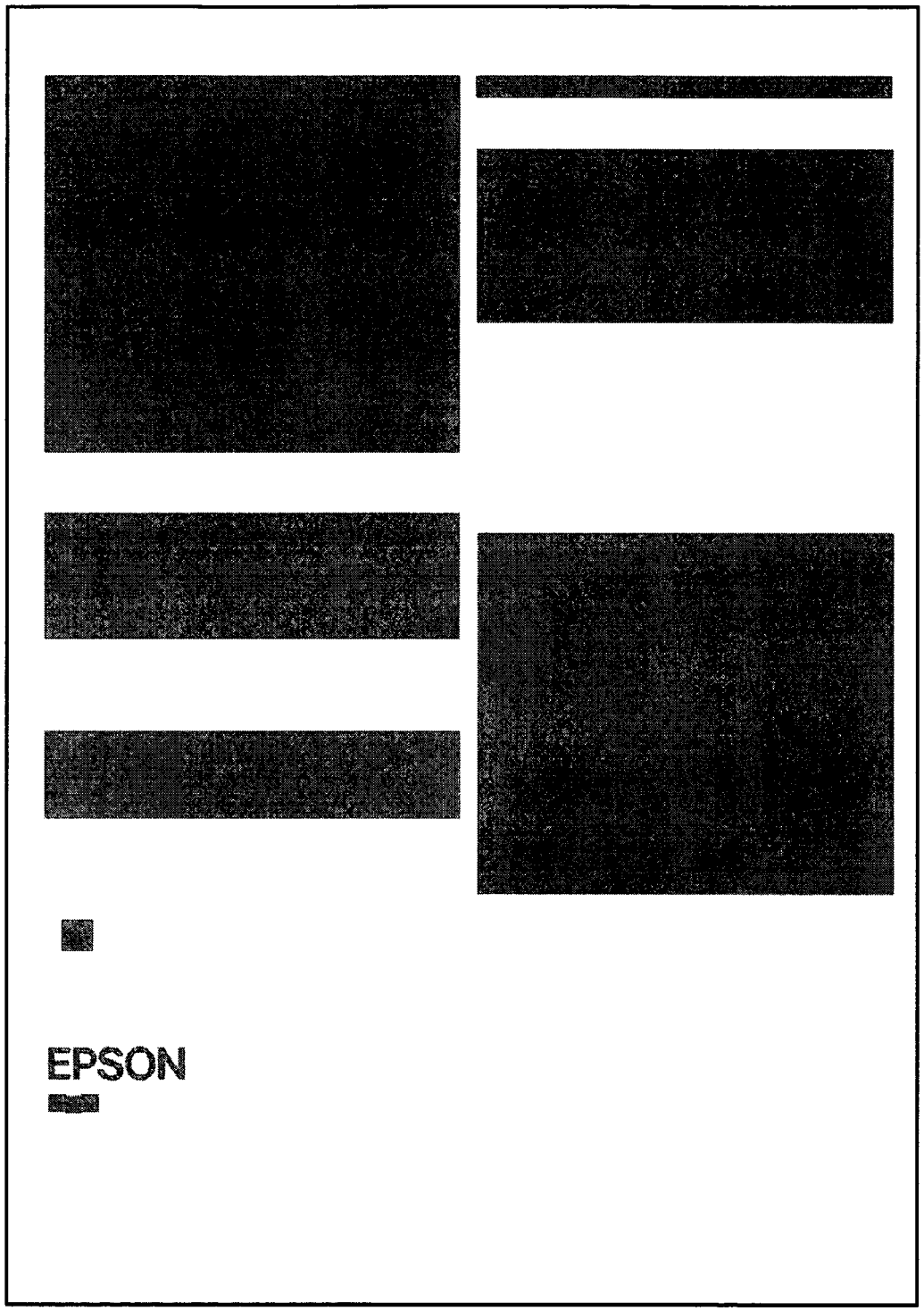
Figure 16D:
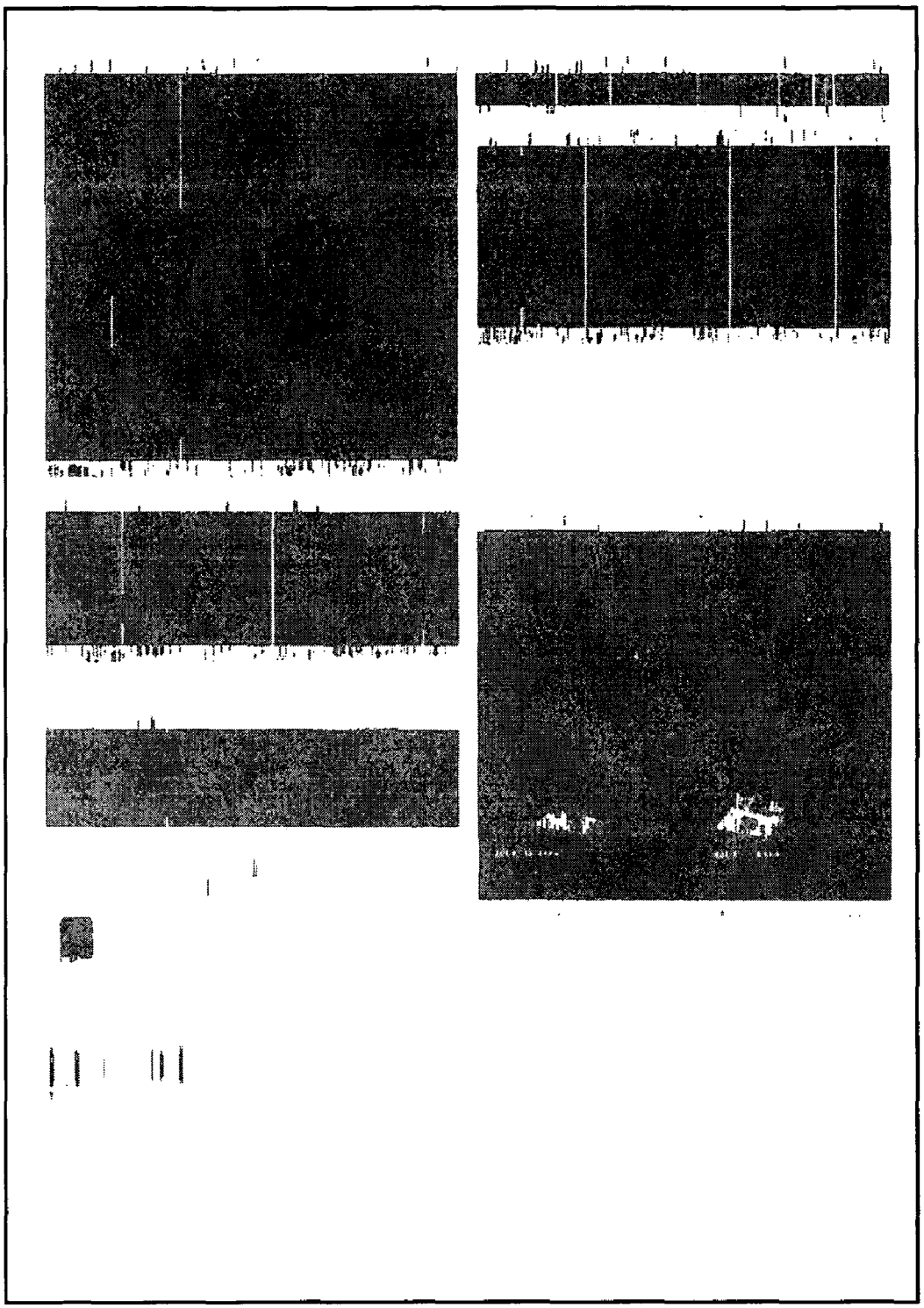
Figure 16E:

FIGS. 16A–16E illustrate performance of the embodiments described above on a multilingual document containing halftones and fine text. For this document it is important to identify halftone regions as accurately as possible since mistakes may lead to loss of quality on fine text. Observe that the document includes fine text with detail strokes and the document is labeled correctly except for the identified problems as discussed below with reference to FIG. 16B. In addition to earlier identified Case 1 and Case 2 situations, this document allows for discussion of Case 3 situations where some fine text close to halftone regions is labeled as being inside the halftone regions (see corresponding regions in FIGS. 16(B), (C), and (D)). The enhancement ramifications of this situation are discussed in more detail with reference to FIG. 19. Case 3 situations typically arise when text characters containing very detailed strokes are close to halftone regions. The detailed strokes are missed by the coarse edge detector but not by the fine edge detector, and they thus enter the halftone counting process. The overall effect is that the main halftone counting neighborhood overlaps legitimate halftone regions and the main count passes $T_{cnt}$. At the same time the partial neighborhoods count the missed fine detail, sometimes passing $T_{p,cnt}$, resulting in false halftone decisions. Note however that this is only a problem if fine text is present very close to halftone regions. The final issue with respect to FIGS. 16A–16E is a combination of Case 2 and Case 4 as illustrated in FIG. 16B. Discussion of Case 4 situations is more clearly illustrated with reference to FIGS. 17A–17E.

FIGS. 17A–17E illustrate performance of the embodiments described above on a multilingual document having a very irregularly shaped halftone region. Observe in FIGS. 17(B), (C), and (D) that most of the halftone is correctly detected, and in particular, our algorithm which only operates over small neighborhoods is very successful in detecting the global segmentation. The main problem with FIG. 17 is illustrated in Case 4 (FIG. 17B) and corresponds to the situation where very small halftone regions are missed by the algorithm. Since the neighborhood sizes used by the algorithm are very small, the size of these missed regions are also expected to be small. As such, they typically pose insignificant problems in enhancement.

FIGS. 18A–18E again shows performance of the embodiments described above on a document with an irregularly shaped halftone region. The document of FIGS. 18A–18E has a smooth transition or gradation from non-halftone to halftone and vice versa (above and below the middle halftone region). The technique described herein not only detects the halftone regions correctly irrespective of the gradation, but the enhancement results on this document are also very robust to this effect. FIG. 18 figure contains Case 2 situations in the dark regions (not marked) but the main potential problem is as shown in Case 5 where there is fine text in a halftone to non-halftone transition area. Many techniques are rigid in their segmentation and enhancement decisions and such areas typically result in very visible abrupt transitions in their output. However, as discussed below with respect to enhancements this situation is not the case for the techniques discussed herein.

Figure 17B:
Figure 17C:
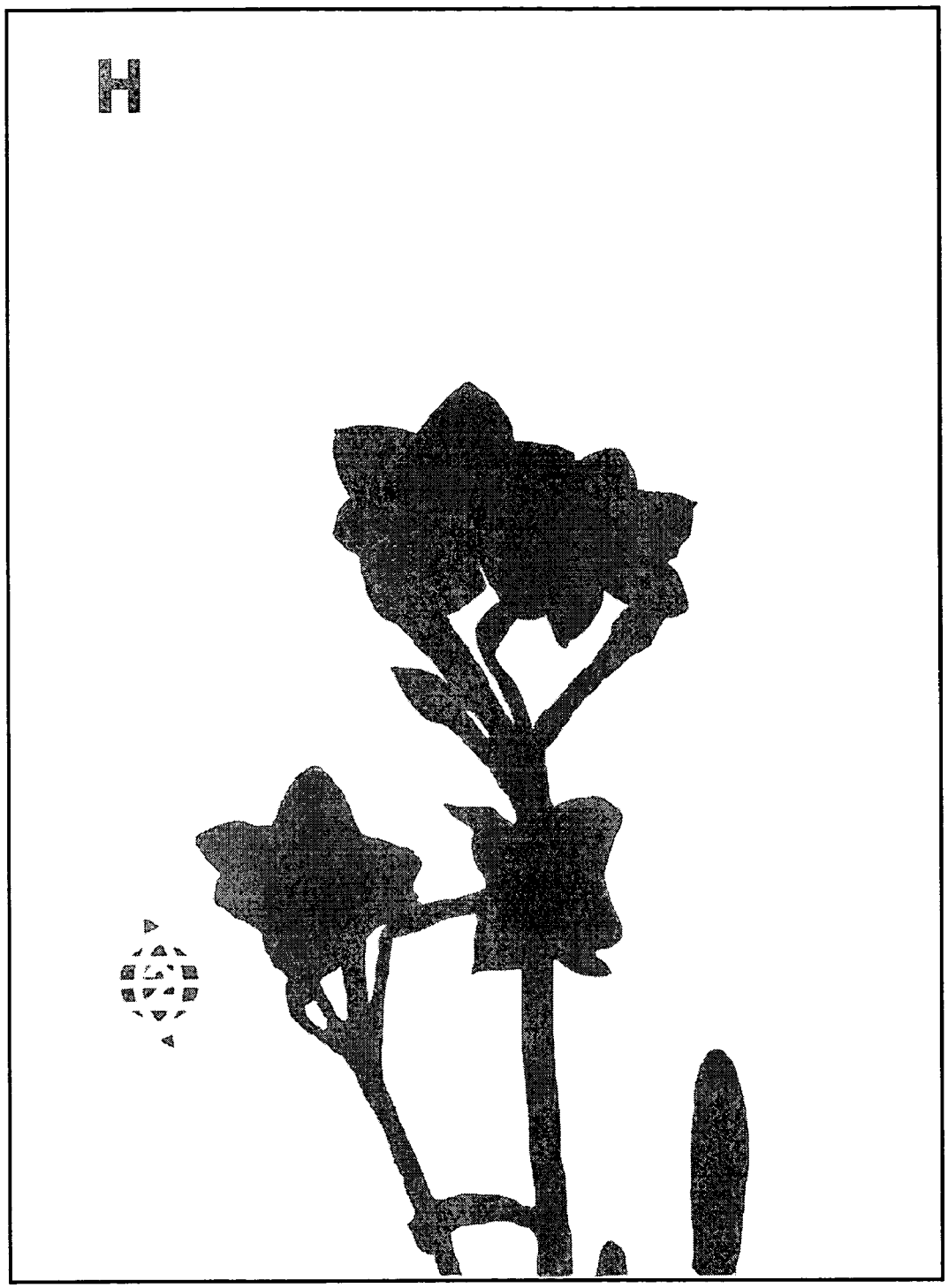
Figure 17D:
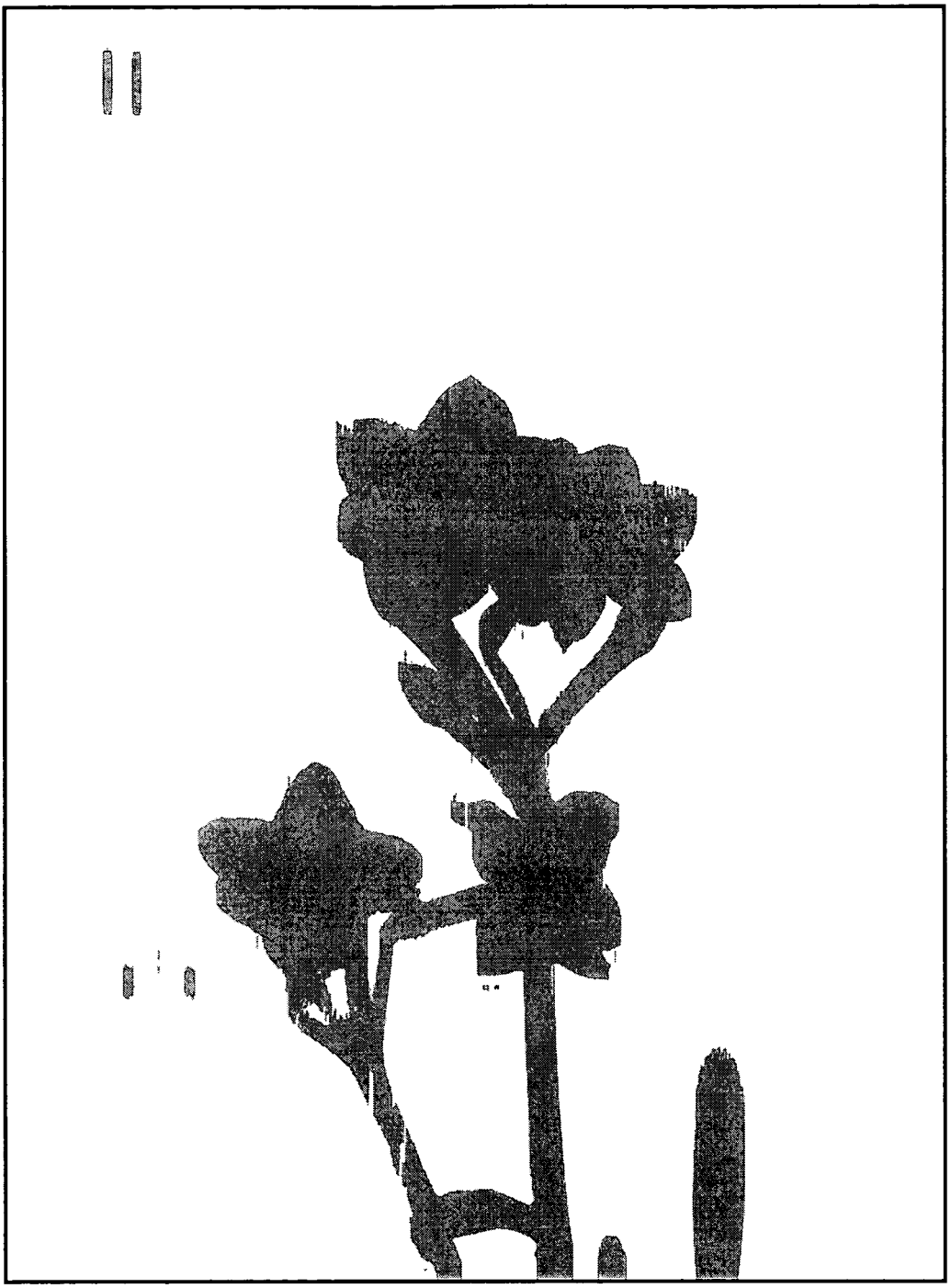
Figure 17E:
Figure 18C:
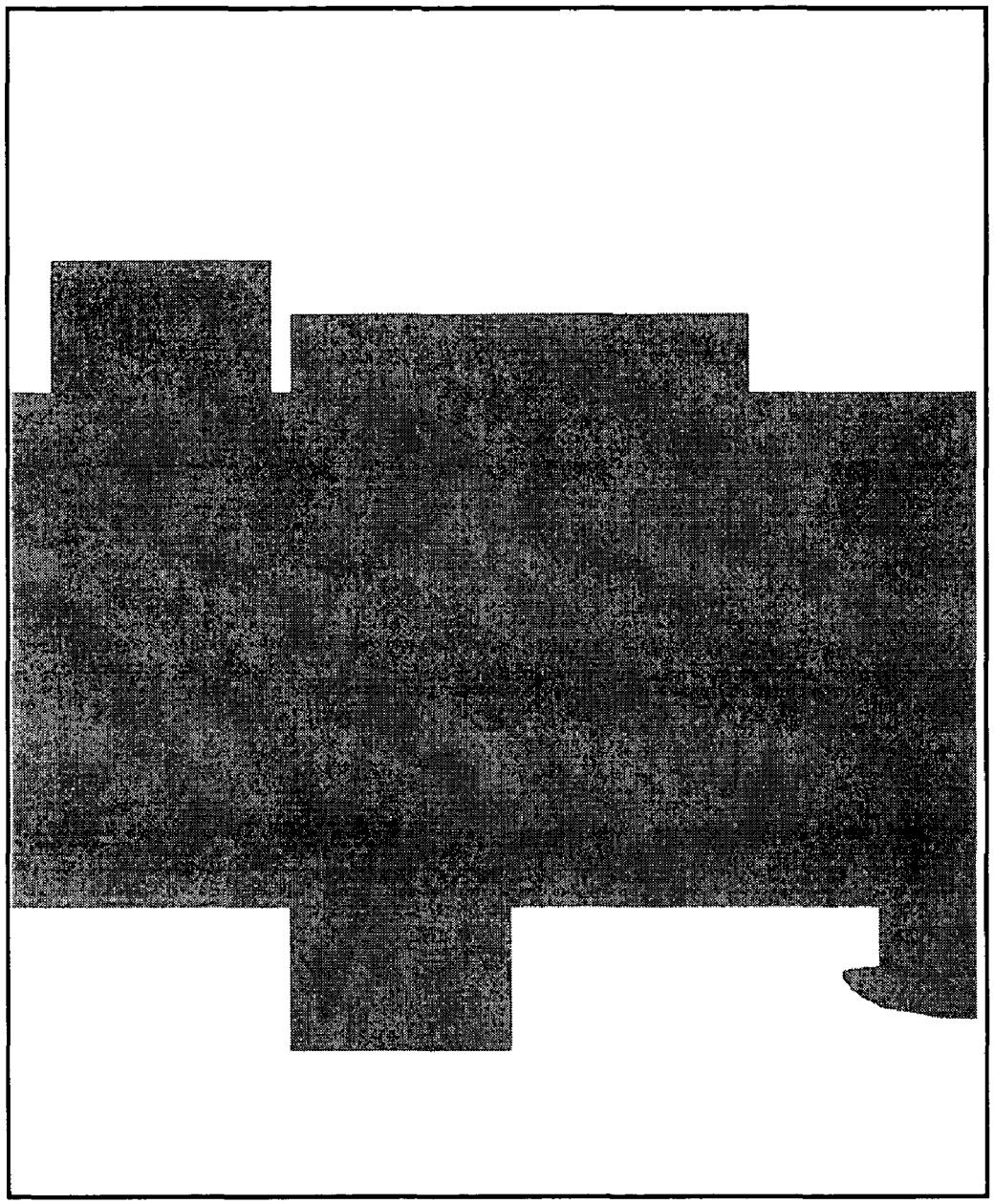
Figure 18D:
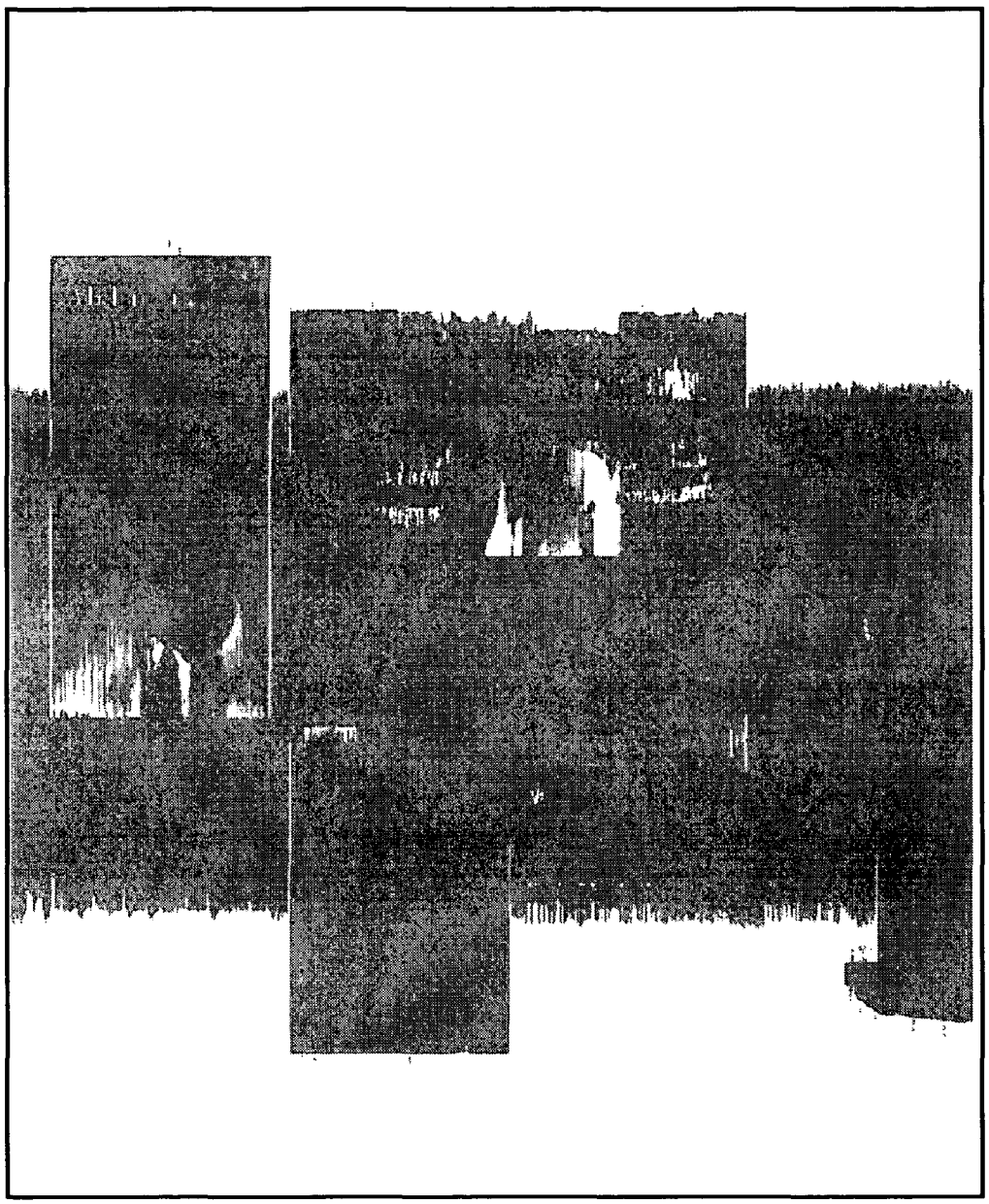
Figure 18E:
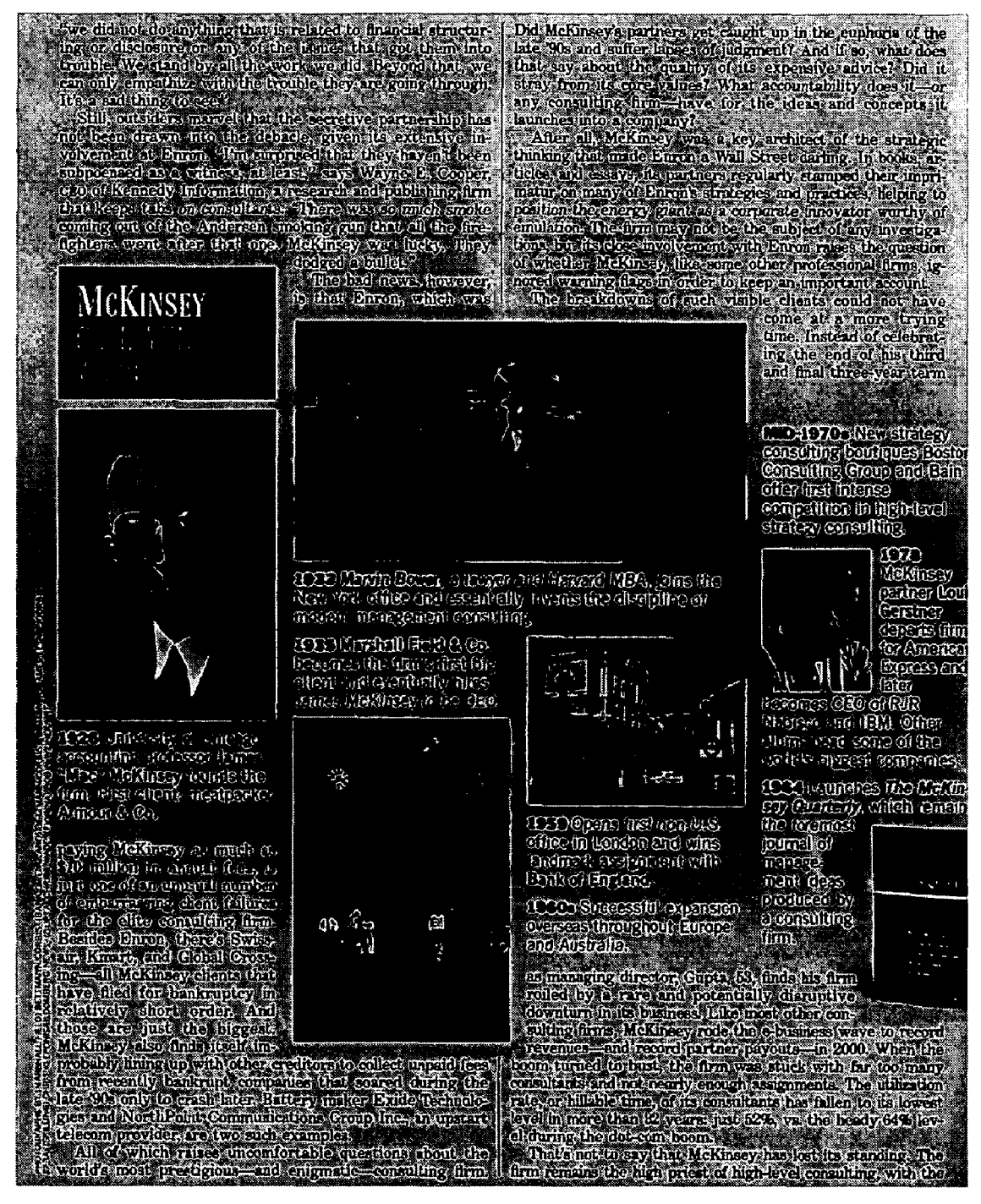

In order to discuss quantitative behavior let $P_{D,h}$ denote the probability that the algorithm detects a halftone pixel given that the ground truth labeling for the pixel is halftone. Similarly let $P_{D,n}$ denote the probability that the algorithm detects a non-halftone pixel given that the ground truth labeling for the pixel is non-halftone. The conditional false alarm or miss probabilities are one minus these probabilities. The overall detection probability $P_D$ is then given by $P_{D,h}$ times the number of ground truth halftone pixels plus $P_{D,n}$ times the number of ground truth non-halftone pixels. For the results in FIG. 16D $P_{D,h}$=0.985, $P_{D,n}$=0.960, and $P_D$=0.970. In FIG. 17D, $P_{D,h}$=0.974, $P_{D,n}$=0.986, and $P_D$=0.984. Finally in FIG. 18D $P_{D,h}$=0.977, $P_{D,n}$=0.978, and $P_D$=0.978. It is clear that these are very good results for the simple technique embodied herein.

Finally note that the labeling stage is designed to be used in conjunction with the enhancement in a very low complexity environment. Many of the identified issues, as well as the mistakes over very small regions, can be corrected if one is willing to resort to region completion and other more elaborate techniques known to one skilled in the art.

The (E) figure set in FIGS. 16, 17, and 18 illustrate the enhancement performance on the earlier examples. These Figures are illustrative that there are no catastrophic errors. Note that the enhancement results include no color or gamma correction to accommodate the scanner characteristics. In one embodiment, the scanner and printer color corrections are handled jointly within the printing pipeline in order to gain computational savings as discussed above. Thus, the presented results are not meant be judged in terms of the correctness and appearance of colors. The (E) set figures also do not include bleed-through removal which will be discussed below.

FIGS. 19A–C, 20A–C, and 21A–C show detailed enhancement performance on the earlier identified potential problem areas. FIGS. 19A–C show the enhancement results under situations due to Case 1 and Case 3 type errors (e.g., compare FIG. 19 to the lower right of the halftone region that is at top left in FIG. 16). These errors will only affect enhancement in situations where there is fine text close to halftone regions. As can be seen in FIGS. 19–21 even in such cases, thanks to the method utilized in enhancing coarse edges, significant problems are avoided. The similarity in the way enhancement factors are calculated discussed above prevents significant visible differences. However, there may be rare occurrences where portions of fine text strokes in such regions may appear blurred if such strokes are not detected in coarse edge detection.

Figure 20A:
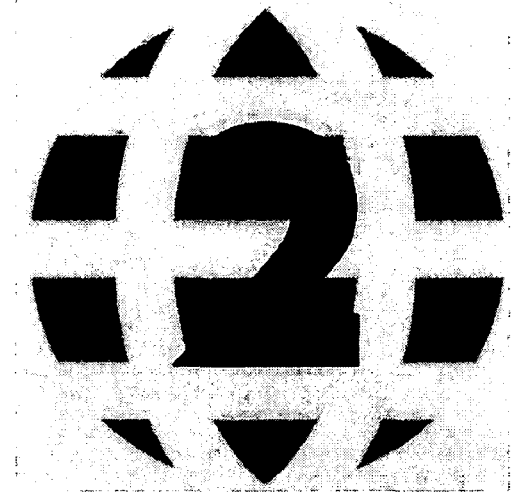
FIGS. 20A–20C illustrate results over Case 4 situations in accordance with one embodiment of the invention.
Figure 20B:
Figure 20C:
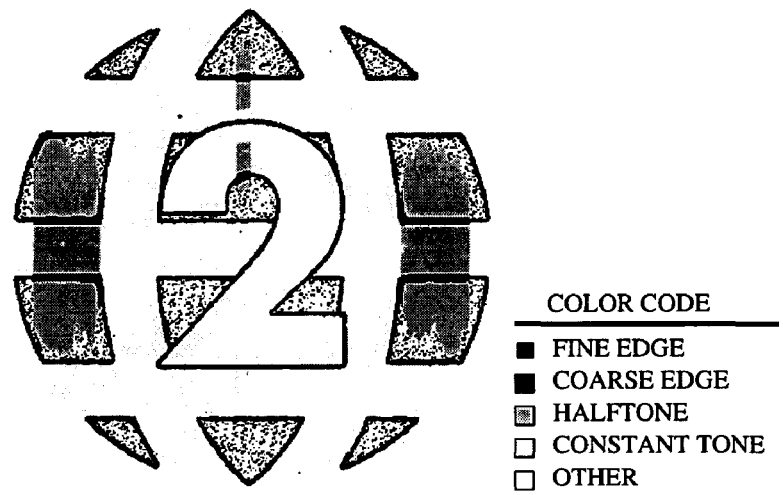

FIGS. 20A–20C illustrate results over Case 4 situations. In this situation small halftone regions, depending on their alignment with respect to the counting neighborhoods in halftone detection, may be missed. The visual effects of such mistakes are negligible since the missed regions are very small to begin with (compare FIG. 20 to the same region in the lower left of FIG. 17 to see the relative size on the full page document).

Figure 21A:
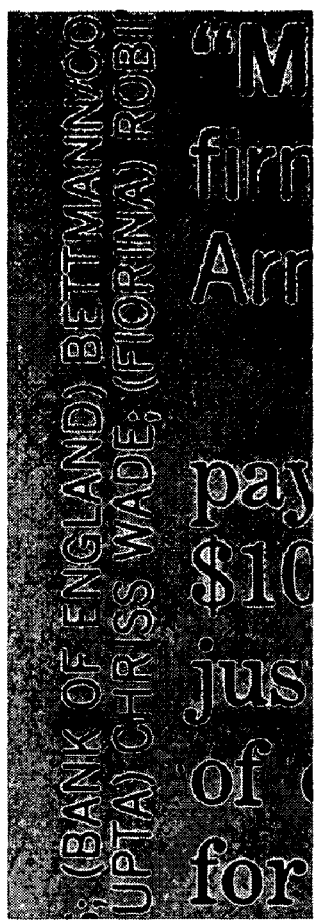
FIGS. 21A–21C show the performance of the technique over Case 5 problems as seen with reference to FIG. 18B.
Figure 21B:
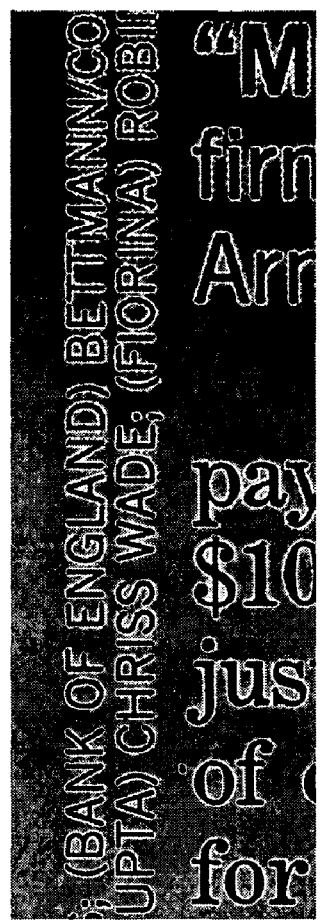
Figure 21C:
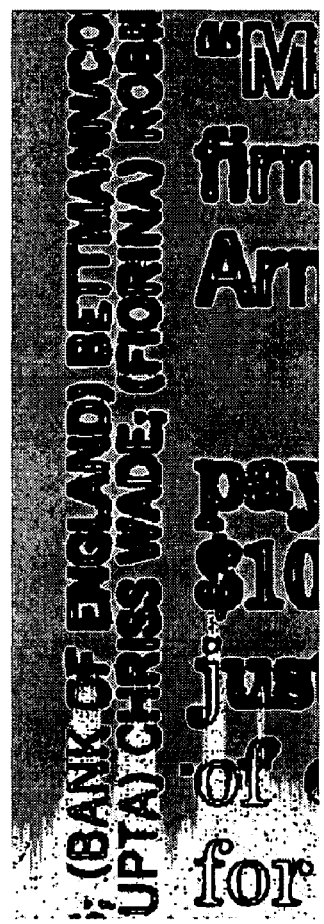

FIGS. 21A–21C show the performance of the technique over Case 5 problems as seen with reference to FIG. 18B. It should be appreciated that that the enhancement in FIG. 21B is uniform and the transition in halftones is correctly handled. Again, the similarity in the way coarse and fine enhancement is designed allows us to avoid noticeable problems. Any visible issues are even further subdued on actual printouts.

FIGS. 22A–22C are a schematic diagrams illustrating the technique's performance on bleed-through removal. It should be noted that the bleed-through is successfully removed and the missed constant tones, pixels labeled as "OTHER" inside and around text regions, do not cause visible problems in the enhanced output. In FIGS. 22A–C the left hand column depicts the originals, the middle column depicts the enhanced documents with bleed-through removal and the right column shows the obtained labels. It should be appreciated that FIG. 22A corresponds to a portion of FIG. 16, FIG. 22B corresponds to a portion of FIG. 17, and FIG. 22C corresponds to apportion of FIG. 18.

The significant computational complexity required by the algorithm is summarized below for each pixel in each color channel. All operations are on integers with most operations on 8 or fewer bit integers.

The symmetric, separable low pass filtering described above with reference to FIG. 4A needs an add and a multiply for about half the number of taps over rows and over columns (due to the separable filter) for each pixel in each channel. For the mentioned parameters at 600 dpi, this corresponds to 2×(3+1)=8 additions and multiplies for each pixel in each channel (a final normalizing division or truncation is needed in integer operation). Of course the multiplies are for full resolution operation and the filter can be implemented multiplier-less as well.

Edge detection requires filtering with the filters of Equation (2) and thresholding. The filters are separable and much simpler than the low pass filter. Filtering requires 1 shift, 2 additions, and 1 subtraction. Two filtering computations are carried out per pixel for each color channel and another factor of two comes in for coarse in addition to fine edge detection, yielding 4 shifts, 8 additions, and 4 subtractions.

For the computations discussed with reference to thin coarse edges, an average of $2N_{prox}+1$ pixels need to be marked with the temporary label in the worst case for each pixel in each channel. Proximity checks using counts over rows and columns are implemented here. A single row buffer is utilized that stores the count of temporary labels on each column corresponding to the sum over $2N_{prox}+1$ rows. In this fashion the horizontal or vertical proximity check may be reduced to 2 checks for labels and corresponding increment by 1 or decrement by 1 operations (a possible increment to update the buffer for a new row and a possible decrement to subtract the influence of an out of scope row). Hence, in the worst case, the total becomes 4 checks for labels and 4 increment/decrement operations for each pixel in each channel.

In one embodiment, the counting required for halftone detection is implemented in two stages as counts over $N_{h,row}$ rows in each column followed by a count over columns. Similar to proximity check calculations, a one row buffer is utilized to store the counts over rows for each column resulting in two increment/decrement operations and two label checks. Counting over columns add two addition/subtraction operations which is carried out for the three counting neighborhoods as discussed with reference to halftone detection and FIG. 10. Therefore, a total of two increment/decrement and 3×2=6 addition/subtraction operations for each pixel in each channel is incurred.

Edge enhancement requires 2 additions and 1 multiplication, which can be done with via a shift depending on $\lambda$. In the enhancement of coarse edges, the filter of Equation (11) requires 2 additions and a shift over rows as well as columns. Hence, worst case edge enhancement needs 6 additions, 2 shifts, and 2 multiplies per edge pixel, in each color channel. Depending on the normalization method a normalizing division may also be performed for each edge pixel, in each color channel.

It can be seen from the above that the main portion of the algorithm requires on the order of 10 multiply and 30 addition/subtraction operations for each pixel in each channel. The bulk of this computation comes from low pass filtering and edge detection. It should be appreciated that any technique that accomplishes descreening on input data needs to be prepared for per pixel low pass filtering. Similarly, for even modest quality in a copier pipeline, at least some edge detection and enhancement is necessary. Hence, the computational resources added by our algorithm over a "baseline" algorithm are those needed by a secondary edge detection and halftone detection. This is on the order of 10 addition/subtraction and 6 increment/decrement operations and corresponds to about 25% increase in computation over the most naive scanner-side algorithm in a copier pipeline.

For applications requiring bleed-through removal, constant-tone detection is also implemented with a row buffer that stores calculations over columns. Squares for variances, etc., are implemented via lookup tables resulting in 1 add and 1 subtract each for the mean and the variance. Calculations for each neighborhood add 1 add and 1 subtract each for the mean and variance followed by a mean normalizing multiply and a subtraction. The total computation comes to $3 \times (2 \times 2) = 12$ addition/subtraction operations plus 2 multiplies and 2 subtractions for each pixel in each channel. The luminance-like index calculation in the simple bleed-through removal scheme described above requires 2 additions and a normalization per pixel. Histogram accumulations further require an addition per pixel, for each color channel. Final histogram normalization, averaging, and segmentation are carried out on a row by row basis. Thus, carrying out the bleed-through scheme further requires on the order of 20 addition/subtraction and 3 multiplication operations. In summation, the technique described herein, requires about 60% more computation over the most naive scanner-side algorithm in a copier pipeline, in one embodiment.

It should be further appreciated that additional computations in the copier pipeline, e.g., color correction and halftoning require significant computation. Hence, the practical computational complexity added by the incorporation of the above described technique is typically an even smaller percentage of the overall computational complexity. One skilled in the art will appreciate that the use of three extra row buffers mentioned above, which are included for computational purposes, are not required in all implementations. However, considering these buffers raises the memory requirements of the technique by another 0.8%, thereby bringing the total memory requirements to approximately 1.5% of full page memory.

In summary, the embodiments described herein provide a multiresolutional, single pass technique that accomplishes segmentation and enhancement of compound documents under relatively low computational complexity and memory requirements. The technique is scalable and provides high halftone detection probabilities. The enhancement stage is designed to operate jointly with the labeling stage, and provide robust operation even under situations where labeling errors may occur. The banded architecture and the sharing of computations between stages enable the technique to provide significant functionality at low computational, memory, and memory bandwidth complexity.

The multi-resolutional technique does processing on the input (fine scale) and the low pass filtered version of the input (coarse scale). Edge detection is done at the two resolutions to mark "coarse edges" on the low pass filtered image and "fine edges" on the original image (See FIG. 4 for a simplified schematic of the labeling process). With the low pass filter chosen to suppress most of the halftone, edge detection on the low pass filtered image marks most of the real edges (due to image edges, text, graphics, etc.), while fine edge detection marks the real edges and halftone dots. All locations that are marked as fine edges but not as coarse edges serve as initial estimates of halftone dots (i.e., result C in FIG. 4). Such locations are counted around each pixel and the result thresholded in order to determine halftone pixels. Coarse edges on detected halftone regions and fine edges on non-halftone regions make up two of the labels in the X field. The variance around each non-halftone pixel is calculated to determine if that pixel is over a constant-tone region. In one embodiment, five possible labels as identified above in Table 1 are possible. Once labeling is done, edge enhancement is carried out on detected coarse and fine edge pixels and descreening is accomplished by low pass filtering the halftone pixels. If desired, simple bleed-through removal is applied. It should be appreciated that computations in the enhancement stage share some of the computational results of the labeling stage in order to reduce the computational complexity.

Consequently, the embodiments described herein combines segmentation and region classification into one seamless labeling stage that is accomplished jointly with descreening and enhancement in a single pass algorithm of comparatively negligible computational complexity, memory, and memory-bandwidth requirements. The technique is fully automated, it is applicable to general compound documents, and it may handle a multitude of halftone types over regions of arbitrary sizes and shapes. While the term "halftone dots" is used throughout it should be appreciated that the technique may be used to detect other types of halftones as well. The above described embodiments may be used for multilingual documents and are effective on compound documents with text characters containing fine strokes.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of labeling digital image data, comprising:
   a) detecting edges defined by image data having a first resolution;
   b) detecting edges defined by the image data having a second resolution;
   c) combining results from a) with results from b) to define intermediate image data;
   d) subtracting the intermediate image data from corresponding results from b); and
   e) associating a label with each pixel of the image data based on results from d).

2. The method of claim 1, wherein the method operation of detecting edges defined by image data having a first resolution includes,
   filtering the image data through a low pass filter.

3. The method of claim 1, wherein the method operation of detecting edges defined by image data having a first resolution includes,
   suppressing halftone dots.

4. The method of claim 1, wherein the method operation of combining results from a) with results from b) to define intermediate image data includes,
   performing a logical AND operation with the results from a) and the results from b).

5. The method of claim 4, wherein the method operation of combining results from a) with results from b) to define intermediate image data includes,
   selecting halftone dots from data resulting from the logical AND operation.

6. The method of claim 1, wherein the method operation of associating a label with each pixel of the image data includes,
   defining a neighborhood around each pixel of the intermediate image data;
   counting values in the neighborhood; and
   determining a region type associated with the neighborhood a value count.

7. The method of claim 1, wherein the method operation of associating a label with each pixel of the image data includes,
   eliminating bleed-through.

8. A method for labeling and enhancing documents defined through digital data, comprising:
   detecting, at multiple frequencies, edge data defined in a portion of the document;
   logically combining corresponding edge data detected at multiple frequencies;
   subtracting the combined edge data from edge data associated with one of the multiple frequencies;
   identifying a region type associated with the portion of the document based on results from the subtracting; and
   labeling a pixel associated with the edge data based upon both the region type and a pixel neighborhood value.

9. The method of claim 8, wherein the digital data defining the document results from a scanning operation.

10. The method of claim 8, wherein the method operation of detecting edge data defined in a portion of the document includes;
    detecting the edge data at multiple resolutions in a single pass.

11. The method of claim 8, wherein the method operation of detecting edge data defined in a portion of the document includes;
    suppressing halftone dots prior to detecting the edge data.

12. The method of claim 8, wherein the method operation of identifying a region type associated with the portion of the document includes,
    defining a neighborhood around the pixel;
    counting values of the neighborhood; and
    comparing the values to a threshold value.

13. The method of claim 12 wherein if a number of values is greater than the threshold value, then the neighborhood is a halftone neighborhood.

14. The method of claim 8, wherein the method operation of labeling a pixel associated with the edge data based upon both the region type and a pixel neighborhood value includes,
    substantially eliminating bleed-through.

15. The method of claim 14, wherein the method operation of substantially eliminating bleed-through includes,
    identifying a non-halftone region;
    defining a neighborhood in a non-halftone regions;
    calculating a variance associated with pixels in the neighborhood, wherein a value of the variance determines whether the neighborhood is a constant tone neighborhood.

16. A computer readable medium having program instructions for labeling digital image data, comprising:
    program instructions for detecting edges defined by image data having a first resolution;
    program instructions for detecting edges defined by the image data having a second resolution;
    program instructions for combining data defined by the first resolution with data defined by the second resolution to define intermediate image data;
    program instructions for subtracting the intermediate image data from corresponding results from detecting edges having the second resolution;
    program instructions for associating a label with a portion of the image data.

17. The computer readable medium of claim 16, wherein the program instructions for detecting edges defined by image data having a first resolution includes,
    program instructions for filtering the image data through a low pass filter.

18. The computer readable medium of claim 16, wherein the program instructions for detecting edges defined by image data having a first resolution includes,
    program instructions for suppressing halftone dots.

19. The computer readable medium of claim 16, wherein the program instructions for associating a label with a portion of the image data includes,
    program instructions for defining a neighborhood around each pixel of the intermediate image data;
    program instructions for counting values in the neighborhood; and
    program instructions for determining a region type associated with the neighborhood a value count.

20. A computer readable medium having program instructions for labeling and enhancing documents defined through digital data, comprising:

program instructions for detecting edge data defined in a portion of the document;
program instructions for logically combining corresponding edge data detected at multiple frequencies;
program instructions for subtracting the combined edge data from edge data associated with one of the multiple frequencies;
program instructions for identifying a region type associated with the portion of the document based on results from the subtracting; and
program instructions for labeling a pixel associated with the edge data based upon both the region type and a pixel neighborhood value.

21. The method computer readable medium of claim 20, wherein the program instructions for detecting edge data defined in a portion of the document includes;
program instructions for detecting the edge data at multiple resolutions in a single pass.

22. The computer readable medium of claim 20, wherein the program instructions for detecting edge data defined in a portion of the document includes;
program instructions for suppressing halftone dots prior to detecting the edge data.

23. The computer readable medium of claim 20, wherein the program instructions for identifying a region type associated with the portion of the document includes,
program instructions for defining a neighborhood around the pixel;
program instructions for counting values of the neighborhood; and
program instructions for comparing the values to a threshold value.

24. A method for segmenting a compound document, comprising:
receiving image data;
processing the image data at both a first scale and a second scale, the processing including subtracting a logical combination of the image data at the first and second scale from corresponding image data at the second scale; and
determining region types of the compound document according to a combination of processing output at the first scale and processing output at the second scale.

25. The method of claim 24, wherein the image data is scanned image data.

26. The method of claim 24, wherein the method operation of processing the image data at both a first scale and a second scale includes,
filtering the image data for the first scale;
performing edge detection on the filtered image data; and
performing edge detection on the image data at the second scale, wherein the processing occurs in a single pass.

27. The method of claim 24, wherein the method operation of processing the image data at both a first scale and a second scale includes,
processing the image data in one of a banded fashion and a blocked based fashion.

28. The method of claim 24, wherein the region types are selected from the group consisting of fine edge, course edge, halftone, and constant tone.

29. The method of claim 24, wherein the method operation of determining region types of the compound document according to a combination of processing output at the first scale and processing output at the second scale includes,
defining a neighborhood around a point of the compound document;
determining a density value for the neighborhood;
comparing the density value to a threshold density in order to identify a region type associated with the neighborhood.

30. A microprocessor configured to segment and enhance image data associated with a compound document, comprising:
circuitry for separately filtering the image data at multiple resolutions;
circuitry for combining corresponding separately filtered image data and subtracting the combined image data from image filtered at one of the multiple resolutions;
circuitry for labeling each pixel of the image data;
circuitry for descreening halftone regions of the image data; and
circuitry for enhancing each identified segment of the image data.

31. The microprocessor of claim 30, wherein the circuitry for labeling each pixel of the image data includes,
circuitry for low pass filtering the image data;
circuitry for detecting edges of both low pass filtered image data and non-low pass filtered image data; and
circuitry for combining data corresponding to detected edges associated with low pass filtering and detected edges associated with non-low pass filtering.

32. The microprocessor of claim 30, wherein the circuitry for labeling each pixel of the image data includes,
circuitry for establishing a neighborhood around a pixel of the image data;
circuitry for counting pixel values in the neighborhood; and
circuitry for comparing a counted pixel value in the neighborhood to a threshold value.

33. The microprocessor of claim 30, wherein the circuitry for labeling each pixel of the image data includes,
circuitry for substantially eliminating bleed-through artifacts.

34. The microprocessor of claim 33, wherein the circuitry for substantially eliminating bleed-through artifacts includes,
circuitry for calculating a variance associated with pixels representing a portion of the image data.

35. An image replication device, comprising:
a labeling module configured to segment image data associated with a document, the image data having a halftone portion and a non-halftone portion, the labeling module including a first branch and a second branch, the first branch configured to suppress halftone dots of the halftone portion prior to detecting edge data of the document, the labeling module further including logic for combining an output of the first branch with an output of the second branch and for subtracting the combined output from corresponding output of the second branch.

36. The image replication device of claim 35, wherein the second branch is configured to detect edge data of the document without suppressing halftone dots.

37. The image replication device of claim 35, wherein the first branch operates at a lower frequency resolution than the second branch.

38. The image replication device of claim 37, wherein the labeling module includes logic configured to count pixels in the halftone dot locations to identify halftone pixels.

39. The image replication device of claim 37, wherein the labeling module includes logic configured to calculate a variance in non-halftone dot location to identify constant tone region pixels.

40. The image replication device of claim 35, further comprising:
  a descreening module configured to output low pass filtered values associated with halftone pixels; and
  an enhancement module configured to compute a sharpening term to be applied to both fine edges and coarse edges.

41. The image replication device of claim 35, further comprising:
  a scanner in communication with a copier pipeline, the copier pipeline including the labeling module; and
  a printer in communication with the copier pipeline.

* * * * *